United States Patent
Zhang et al.

(10) Patent No.: US 12,393,768 B2
(45) Date of Patent: Aug. 19, 2025

(54) LAYOUT-AWARE MULTIMODAL PRETRAINING FOR MULTIMODAL DOCUMENT UNDERSTANDING

(71) Applicant: Google LLC, Mountain View, CA (US)

(72) Inventors: Mingyang Zhang, San Jose, CA (US); Cheng Li, Mountain View, CA (US); Tao Chen, Sunnyvale, CA (US); Spurthi Amba Hombaiah, Mountain View, CA (US); Michael Bendersky, Cupertino, CA (US); Marc Alexander Najork, Palo Alto, CA (US); Te-Lin Wu, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 12 days.

(21) Appl. No.: 17/928,984

(22) PCT Filed: Dec. 22, 2020

(86) PCT No.: PCT/US2020/066588
§ 371 (c)(1),
(2) Date: Dec. 1, 2022

(87) PCT Pub. No.: WO2022/139807
PCT Pub. Date: Jun. 30, 2022

(65) Prior Publication Data
US 2023/0222285 A1     Jul. 13, 2023

(51) Int. Cl.
*G06F 40/166*     (2020.01)
*G06F 40/109*     (2020.01)
(Continued)

(52) U.S. Cl.
CPC .......... *G06F 40/166* (2020.01); *G06F 40/109* (2020.01); *G06F 40/284* (2020.01); *G06V 30/413* (2022.01)

(58) Field of Classification Search
CPC .... G06F 40/166; G06F 40/109; G06F 40/284; G06F 16/483; G06F 16/93; G06V 30/413; G06N 3/084
See application file for complete search history.

(56) References Cited

U.S. PATENT DOCUMENTS 6,427,146 B1 *  7/2002  Chu .................... G06F 16/2358
                                          707/999.102
6,453,312 B1 *  9/2002  Goiffon ............... G06F 16/3323
                                          707/999.005
(Continued)

FOREIGN PATENT DOCUMENTS

CN         1786947        6/2006
CN       111460176        7/2020
(Continued)

OTHER PUBLICATIONS

Subhojeet Pramanik et al., Towards a Multi-modal, Multi-task Learning based Pre-training Framework for Document Representation Learning, Sep. 30, 2020, ARXIV.org, 1-8 (Year: 2020).*

(Continued)

*Primary Examiner* — Phenuel S Salomon
(74) *Attorney, Agent, or Firm* — DORITY & MANNING P.A.

(57) ABSTRACT

Systems and methods for document processing that can process and understand the layout, text size, text style, and multimedia of a document can generate more accurate and informed document representations. The layout of a document paired with text size and style can indicate what portions of a document are possibly more important, and the understanding of that importance can help with understanding of the document. Systems and methods utilizing a hierarchical framework that processes the block-level and (Continued)

the document-level of a document can capitalize on these indicators to generate a better document representation.

20 Claims, 18 Drawing Sheets

(51) Int. Cl.
    *G06F 40/284* (2020.01)
    *G06V 30/413* (2022.01)

(56) References Cited

U.S. PATENT DOCUMENTS

| | | | |
|---|---|---|---|
| 6,938,034 B1* | 8/2005 | Kraft | G06F 40/194 |
| 11,146,613 B2* | 10/2021 | Felderman | H04L 67/02 |
| 2011/0022599 A1* | 1/2011 | Chidlovskii | G06F 16/3347 |
| | | | 707/E17.046 |
| 2020/0151591 A1 | 5/2020 | Li | |
| 2021/0255862 A1* | 8/2021 | Volkovs | G06F 9/30036 |
| 2022/0092269 A1* | 3/2022 | Le | G06N 3/044 |

FOREIGN PATENT DOCUMENTS

| | | |
|---|---|---|
| CN | 111680490 | 9/2020 |
| EP | 2278498 | 10/2016 |

OTHER PUBLICATIONS

Yang et al., "Beyond 512 Tokens: Siamese Multi-depth Transformer-based Hierarchical Encoder for Long-Form Document Matching", 2020, Proceedings of the 29th ACM International Conference on Information & Knowledge Management, pp. 1725-1734. (Year: 2020) (Year: 2020).*

International Search Report for Application No. PCT/US2020/066588, mailed on Aug. 27, 2021, 3 pages.

Pramanik, et al., "Towards a Multi-modal, Multi-task Learning based Pre-training Framework for Document Representation Learning", arxiv.org, XP081774429, Sep. 30, 2020, 8 pages.

Xu, et al., "LayoutLM: Pre-training of Text and Layout for Document Image Understanding", Proceedings of the 26th ACM SIGKDD International Conference on Knowledge Discovery and Data Mining, New York, New York, Aug. 23, 2020, XP058461000, 10 pages.

International Preliminary Report on Patentability for Application No. PCT/US2020/066588, mailed Jul. 6, 2023, 8 pages.

Chinese Search Report Corresponding to Application No. 2020801026695 on Sep. 12, 2024.

Chinese Search Report Corresponding to Application No. 2020801026695 on Jun. 3, 2025.

* cited by examiner

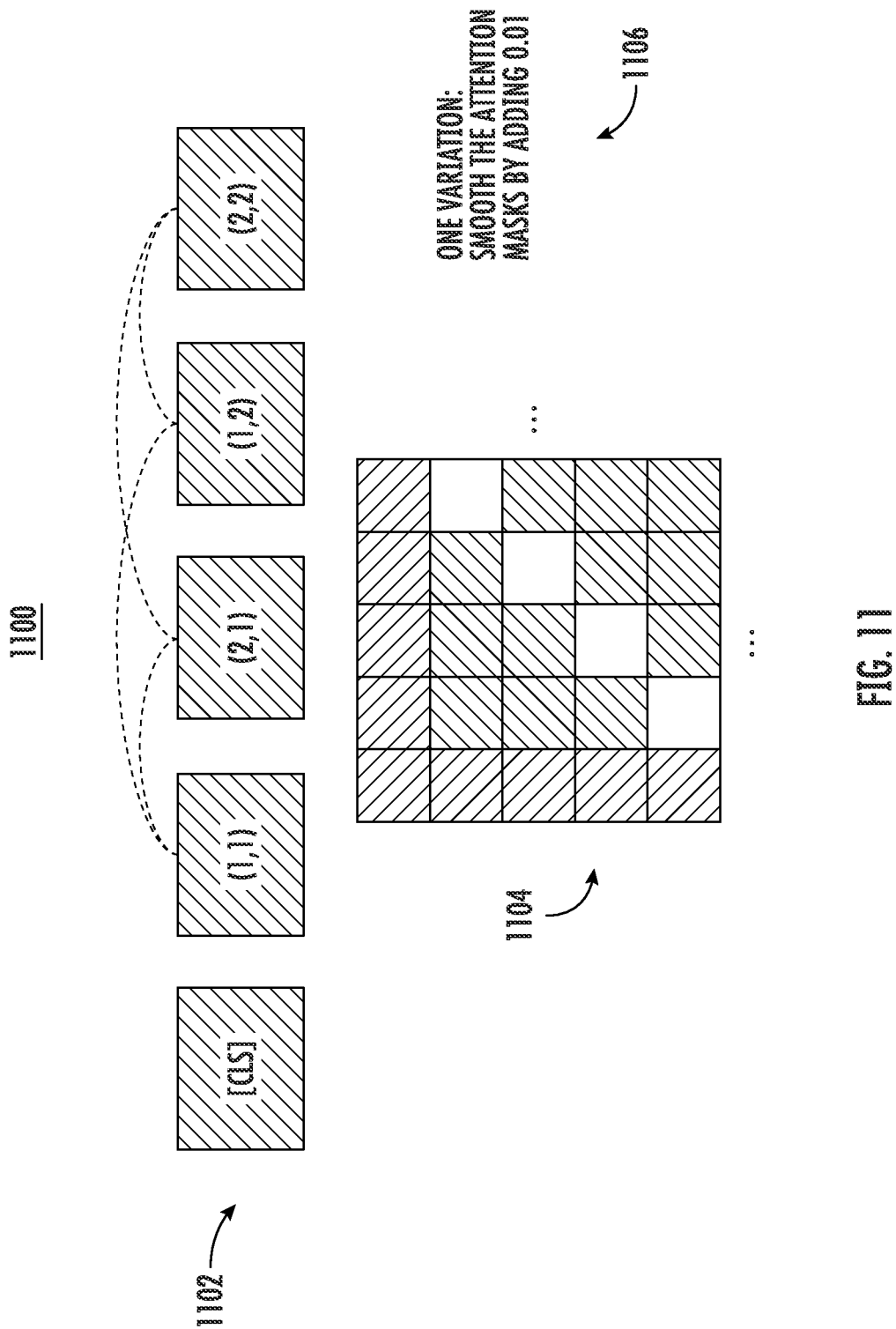

LAYOUT-AWARE MULTIMODAL PRETRAINING FOR MULTIMODAL DOCUMENT UNDERSTANDING

PRIORITY CLAIM

This application is based upon and claims the right of priority under 35 U.S.C. § 371 to International Application No. PCT/US2020/066588 filed on Dec. 22, 2020, which is incorporated by reference herein.

FIELD

The present disclosure relates generally to document processing. More particularly, the present disclosure relates to training and utilization of a multimodal, layout-aware machine-learned document encoding model.

BACKGROUND

Document representations can include encoded information (e.g., semantic information) about a document. Document representations can be used for various downstream tasks, such as natural language processing, question answering, document summarization, or information retrieval (e.g., document retrieval). In certain existing models, the processing of documents to generate these document representations is focused on the text content. The distribution and quantity of certain words or phrases is the focal point of some of these existing models. Layout and images are not considered in these existing models.

Document layout can include both structural and visual (e.g. font size) information that can be vital but, at times, is ignored by machine-learning models. Existing models which do use layout information typically consider only textual content and overlook the existence of contents in other modalities such as images. Additionally, spatial interactions of presented contents in a layout has not been fully exploited.

Moreover, language models are often limited to considering only textual content and further assume that all text is of equal importance. As such, the location of the text in the document, the size of the text, and other features of the text are not considered. For example, a sub-header bolded with larger font is given the same importance as smaller text in the body of a paragraph. Location and size of text can indicate the importance of the text, and a failure to factor in these features can lead to the document's text not being considered in context.

Furthermore, language modeling systems often disregard the importance of images in documents. Images can provide an added nuance in processing documents and are often overlooked. The content of text being the only considered portion of a document can lead to the consideration of only a portion of the document. Pictures can add emphasis to a subject or depict something the text cannot describe in brevity.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating layout-aware document representations. The method can include obtaining, by a computing system, a document. In some implementations, the document can include text and one or more images. The layout data may be associated with the document. The method can include partitioning, by the computing system, the document into a plurality of blocks based at least in part on the layout data. In some implementations, the method can include processing, by the computing system, each of the plurality of blocks with a machine-learned block-level encoder model to respectively generate a plurality of block-level representations for the plurality of blocks. For each of the plurality of blocks, the layout data associated with such block can be provided as input to the machine-learned block-level encoder model. The method can include processing, by the computing system, the plurality of block-level representations with a machine-learned document-level encoder model to generate a document-level representation for the document. In some implementations, the method can include providing, by the computing system, the document-level representation as an output.

In some implementations, the layout data can include at least one of style data, font data, or color data descriptive of one or more of the plurality of blocks in the document. The layout data can include spatial layout data descriptive of spatial positions of the plurality of blocks within the document. In some implementations, partitioning the document can include partitioning, by the computing system, the document based at least in part on one or more HTML tags associated with the document. The method can include at least one of the plurality of blocks having both textual content and image content. In some implementations, processing, by the computing system, each of the plurality of blocks that includes one or more images with the machine-learned block-level encoder model can include processing the one or more images included in a block with a convolutional neural network and an embedding model to generate one or more image embeddings for the one or more images. In some implementations, one or both of the machine-learned block-level encoder model and the machine-learned document-level encoder model can include a multi-headed self-attention model. Partitioning, by the computing system, the document into the plurality of blocks can include processing the document with a tokenizer. The method can include processing, by the computing system, the document-level representation to determine a classification of the document. In some implementations, the method can include processing, by the computing system, the document-level representation with a search engine to generate a results list, in which the results list includes a plurality of additional documents with data related to that of the document. The method can include generating, by the computing system, a document summary based at least in part on the document-level representation. In some implementations, the document is a webpage. The layout data can be encoded in attention maps. In some implementations, the layout data can include position data, in which the plurality of blocks can include a first block and a second block, and in which the position data can include data descriptive of a relative position of the first block in relation to the second block. The machine-learned block-level encoder model can include both a transformer model that encodes text blocks and a convolutional neural network that encodes image blocks. In some implementations, the machine-learned block-level encoder model can be trained with block-level pretraining objectives, in which the block-level pretraining objectives can include masked language modeling and image-text matching, and the machine-learned document-level encoder model can be trained with document-level pretraining objectives, in which the document-level pretraining objectives can include block-ordering prediction, masked-block prediction, and image fitting. In some implementations, the method can include storing, by the computing system, the document-level representation in a database.

Another example aspect of the present disclosure is directed to a computing system. The computing system can include one or more processors and one or more non-transitory computer readable media that collectively store instructions that, when executed by the one or more processors, cause the computing system to perform operations. The operations can include obtaining, by the computing system, a document, in which the document can include text and one or more images, and layout data can be associated with the document. The operations can include partitioning, by the computing system, the document into a plurality of blocks based at least in part on the layout data. In some implementations, the operations can include processing, by the computing system, each of the plurality of blocks with a machine-learned block-level encoder model to respectively generate a plurality of block-level representations for the plurality of blocks, in which, for each of the plurality of blocks, the layout data associated with such block can be provided as input to the machine-learned block-level encoder model. The operations can include processing, by the computing system, the plurality of block-level representations with a machine-learned document-level encoder model to generate a document-level representation for the document. The operations can include evaluating, by the computing system, a loss function based at least in part on a prediction that can be based on the document-level representation. In some implementations, the operations can include modifying, by the computing system, one or more parameters of at least one of the machine-learned block-level encoder model or the machine-learned document-level encoder model based at least in part on the loss function.

The prediction can include a block-ordering prediction. In some implementations, the block-ordering prediction can be generated by switching, by the computing system, at least a first block and a second block from the plurality of blocks, in which switching the first block and the second block from the plurality of blocks occurs before the processing, by the computing system, each of the plurality of blocks with the machine-learned block-level encoder model, and generating, by the computing system, a binary prediction that indicates whether the plurality of blocks are in a correct order based at least in part on the document-level representation, in which the binary prediction can be the block-ordering prediction. In some implementations, the prediction can include a predicted text block. The predicted text block can be generated before processing, by the computing system, the plurality of block-level representations with the machine-learned document-level encoder model. The prediction can be generated by masking, by the computing system, a block-level representation generated for one or more text blocks of the plurality of blocks, and selecting, by the computing system, the predicted text block from a plurality of candidate text blocks based at least in part on the document-level representation. In some implementations, the prediction can include a predicted image. The predicted image can be generated before processing, by the computing system, each of the plurality of blocks with the machine-learned block-level encoder model. The predicted image can be generated by masking, by the computing system, one or more images included in one or more blocks of the plurality of blocks, and selecting, by the computing system, the predicted image from a plurality of candidate images based at least in part on the document-level representation. In some implementations, the operations can include evaluating, by the computing system, a block-level loss function based at least in part on an image-matching prediction that can be based on one or more of the block-level representations. The operations can include modifying, by the computing system, one or more parameters of the machine-learned block-level encoder model based at least in part on the block-level loss function. In some implementations, the image-text matching prediction can be generated by sampling, by the computing device, one or more training images from a training document; replacing, by the computing device, one or more images from the document with the one or more training images; and determining, by the computing device, a binary matching prediction based at least in part on the one or more block-level representations, in which the binary matching prediction can be the image-text matching prediction and predicts whether or not image replacement was performed.

Another example aspect of the present disclosure is directed to one or more non-transitory computer readable media that collectively store instructions that, when executed by the one or more processors, cause a computing system to perform operations. The operations can include obtaining a document, and in which layout data can be associated with the document. The operations can include partitioning the document into a plurality of blocks based at least in part on the layout data. In some implementations, the operations can include processing each of the plurality of blocks with a machine-learned block-level encoder model to respectively generate a plurality of block-level representations for the plurality of blocks, in which, for each of the plurality of blocks, the layout data associated with such block can be provided as input to the machine-learned block-level encoder model. The operations can include processing the plurality of block-level representations with a machine-learned document-level encoder model to generate a document-level representation for the document. The operations can include providing the document-level representation as an output.

In some implementations, the operations can include determining a block type for each of the plurality of blocks based at least in part on the layout data. In some implementations, a block type of a first block can be at least one of a header, a paragraph, an image, a list, or a table.

Another example aspect of the present disclosure is directed to a computer-implemented method for pretraining. The method can include obtaining, by a computing system, a plurality of media training blocks from one or more training documents. In some implementations, each of the plurality of media training blocks can include one or more images from the one or more training documents. The method can include masking, by the computing system, one or more images of a media training block of the plurality of media training blocks to obtain a masked training block. The method can include processing, by the computing system, the plurality of media training blocks with the machine-learned block-level encoding model to generate a respective plurality of media block-level representations. In some implementations, the media block-level representation for the masked training block can include a prediction output that selects a replacement image from a pool of candidate images generated from the masked training block and each of a plurality of additional masked training blocks from the training batch. The method can include evaluating, by the computing system, a pre-training loss function that evaluates a difference between the prediction output and ground truth data associated with the masked training block and the plurality of additional masked training blocks. The method can include adjusting, by the computing system, one or more parameters of the machine-learned block-level encoding model based at least in part on the pre-training loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 11 depicts a block diagram of an example document-level attention mask model according to example embodiments of the present disclosure.

FIG. 12 depicts a block diagram of an example document processing model according to example embodiments of the present disclosure.

DETAILED DESCRIPTION

Overview

Figure 1A:
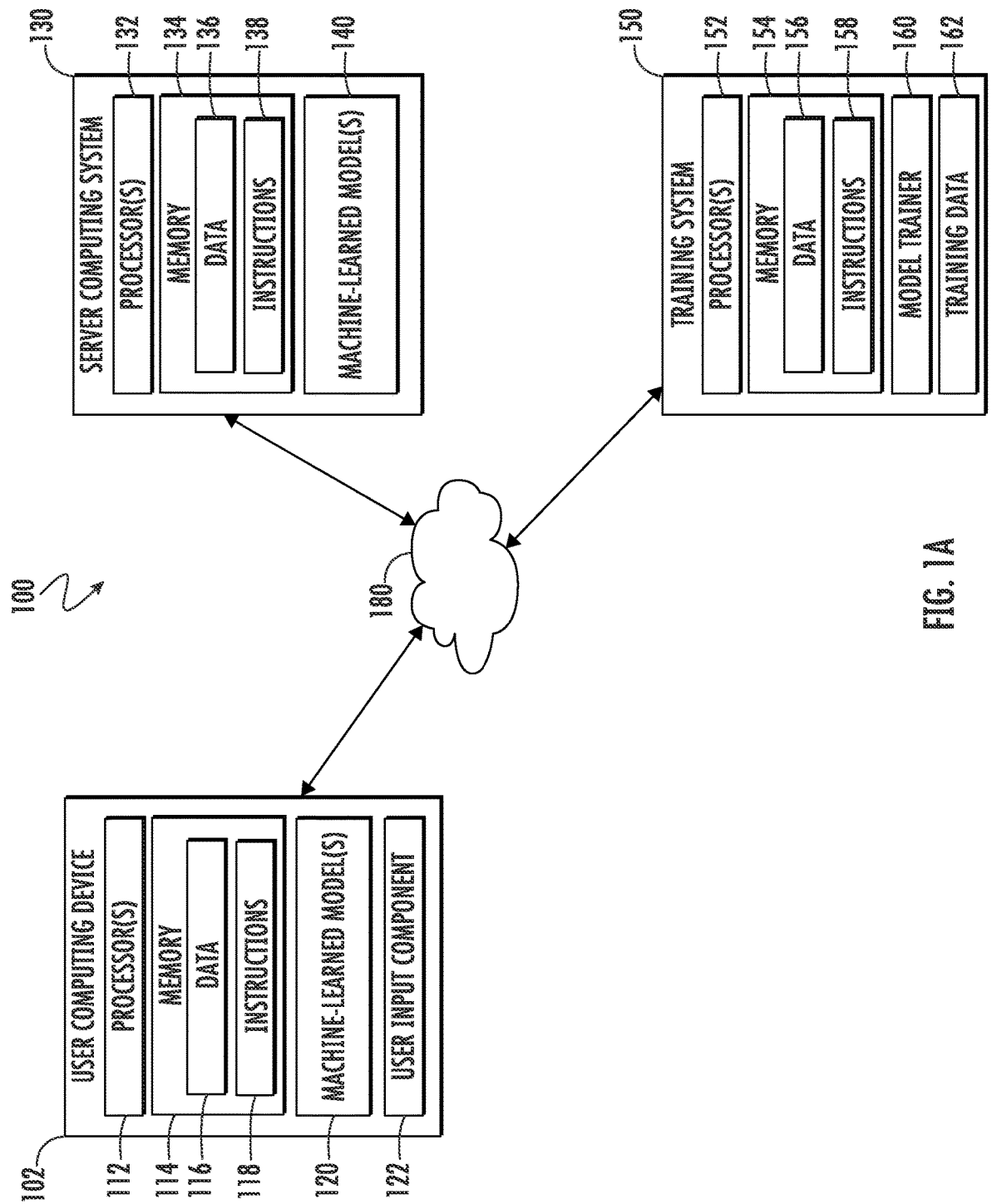
FIG. 1A depicts a block diagram of an example computing system that performs document processing according to example embodiments of the present disclosure.

Generally, the present disclosure is directed to systems and methods for document understanding based on layout and metadata. In particular, example aspects of the present disclosure provide a hierarchical encoder model that generates a document-level representation for a document which includes both text and images. In some implementations, the systems and methods may include intaking a document (e.g., webpage, file, etc.) and processing the layout and metadata of the document. For example, layout information can include text style, font, color of text/images in a document, the relative positions among different text and image components, and/or various other information. The hierarchical encoder model can use the layout information to generate an improved document-level representation for the document.

More particularly, the systems and methods can be used to generate layout-aware document representations. The systems and methods can include obtaining a document. The document may include text and images with layout data descriptive of the layout in the document. Layout data may include style data, font data, or color data descriptive of one or more of the blocks in the document. The systems and methods can include partitioning the document into blocks based at least in part on the layout data. In some implementations, the systems and methods can include processing each block with a block-level encoder model to generate block-level representations for each respective block. In some implementations, the block-level encoder may process the layout data descriptive of the document. The systems and methods can include processing the block-level representations with a document-level encoder to generate a document-level representation. The document-level representation may be the output for the systems and methods. In some implementations, the document-level representation may include data descriptive of an order for the plurality of blocks.

For example, the system or method can first parse a document into blocks whose content can be textual, tabular, or multimedia (e.g. images) using a proprietary tool. The system can include a hierarchical framework to encode the blocks. The encoder model can encode each block with a multimodal transformer in the lower-level and aggregates the block-level representations and connections utilizing a specifically designed transformer at the higher-level. The system can be trained on hierarchical pre-training objectives, where the lower-level model, or block-level, can be trained with the standard masked language modeling (MLM) loss and the multimodal alignment loss (i.e. image-text matching), and the higher-level model, or document-level, can be trained with three layout-aware objectives: (1) block-order predictions, (2) masked block predictions (i.e. block MLM), and (3) image fitting predictions.

In some implementations, the system can utilize an in-house document tokenizer to parse HTML formatted pages into several content blocks, where each block can have the following features: (1) spatial position as 2D coordinates within the document, (2) semantic types of the presented contents (e.g., headers, tables, paragraphs, images, etc.) and (3) attributes particularly for the textual contents such as font-sizes, boldness, and italics. In some implementations, the document can be partitioned based at least in part on HTML tags associated with the document.

In some implementations, a block-level transformer can take inputs as the parsed multimodal content blocks serialized by their sorted spatial positions, and then a document-level transformer can accept the block-level representations. The block-level model can be trained with the Masked Language Modeling (MLM) objective and/or an image-to-text alignment prediction, or image-text matching, for grounding different input modalities. For training the document-level model, three block-level pre-training objectives can be used to exploit the structure of a document: (1) block-order predictions can be used by the model to predict whether the input blocks are properly ordered, (2) masked-block predictions, or block MLM, can act at the textual block-level, and/or (3) image fitting predictions can be used to select the most suitable image for a missing image block.

In some implementations, the systems and methods can partition the document into blocks. The blocks can include text, photos, video, or any other form of content. For example, the systems and methods may use HTML cues, spatial layout, and/or other characteristics to define blocks. Moreover, in some implementations, the system or method can use the spatial layout to group certain blocks.

In some implementations, the system and method may use a hierarchical model. The hierarchical model may include a lower level of hierarchy (e.g., a block-level) and a higher level of hierarchy (e.g., a document-level). The block-level can encode respective subsets of text blocks and images with their respective style, font, and color information. The document-level can consider the positions of and relative positions among different text blocks and images to generate a document-level representation for the document.

The document-level representation can be used for a number of downstream tasks. As examples, personalizing content, document retrieval, document classification, web page understanding, question answering, and document summarizing can all be implemented with the systems and methods disclosed herein. For example, in the case of document classification, the document-level representation may be processed to determine a classification of the document. For example, the document may be classified as a particular document type.

Additional aspects of the present disclosure provide training techniques (e.g., pre-training techniques) for training the encoder model. As one example, the higher level of the hierarchy may be trained using novel pre-training tasks to predict the relative positions among text blocks/images, to predict if a text block/image is a good fit with the rest of the document data, and/or other tasks.

The systems and methods may consider both layout and multimodalities for self-supervisions in documents. The layout and multimodalities may be viewed as strong inductive bias for transferability. The systems and methods may utilize various aspects of layouts physically and virtually in a model. The model may include a hierarchical framework based on the layouts of the documents or files.

The systems or methods may use a tokenizer for the data processing. In some implementations, the system may use a block tokenizer. The block tokenizer can process block positions, block types (e.g., header, image and text, paragraph, etc.), block attributes (e.g., bold, italic, font size, etc.), and images. For example, the systems and methods may utilize a go/block-tokenizer for block and layout processing. The tokenizer may be able to characterize the data into sub-groups (e.g., header, lists, paragraph, image, table, etc.) based on block type.

In some implementations, the system can process text blocks and image blocks together based on the layout of the document. The system may process the text blocks and image blocks with a visual-linguistic (VL) transformer. The system may use one or more VL transformers for processing the document. The VL transformers can feed into a higher-level visual-linguistic (HVL) transformer. The low level, or block-level, training objectives can include intra-block processing, and the high level, or document-level, training objectives can include inter-block processing. In some implementations, the block-level visual-linguistic encoder may include a convolutional neural network and an embedding model to process images.

The VL transformer and HVL transformer can be trained for certain training objectives. The training objectives may allow the model to complete downstream tasks post training, such as document retrieval, document classification, web page understanding, question answering, personalizing advertisements, and document summarizing. The training may be performed using ground truth training data. For example, the model can be trained for document classification with ground truth data that may include a document and a pre-determined classification for the document.

The block-level may involve block sorting and block information processing. The block sorting can include local connection constructions and block serialization. Furthermore, the block-level may include standard masked language modeling (MLM) and/or multimodal alignment prediction (MAP).

The document-level may involve a content completion step and content position step. The content completion step can include block-level masked learning and/or image-suggestion prediction. The content position step can include block-ordering prediction.

The block-level and document-level can be reinforced with learning and inference.

The system or method may include a block sorting step, which determines the coordinates of each block with respect to all other blocks. For example, a block in the top left corner may be (1,1); a block in the top right corner may be (2,1); a block below the (1,1) block may be (1,2); a block below the (2,1) block may be (2,2); and the block denotation may continue throughout the document.

The VL transformer can process a variety of inputs. For example, the VL transformer may process merged text from (1,1) with a CLS token, block information, and block segmented IDs. Another example may include the VL transformer processing an output embedding from an embedding model that processed the output of a convolutional neural network which received an image and a block segmentation ID as input.

The system or method can use one transformer per block or can use one transformer for multiple blocks. The one transformer per block can introduce padding and can lead to quick processing of title blocks. The one transformer for multiple blocks can be achieved by simulating multiple transformers with the use of attention masks. For example, the system or method may utilize a block-level attention mask to process the blocks. The block-level attention masks may be used for processing both textual blocks and media blocks. The block-level attention masks may include a layered approach in which the system generates layers of masks. The masks can be real-value masks. Furthermore, the training of the attention models can add precision to the system's ability to approximate text and images. Although example encoders are discussed with particular reference to transformer models, other encoder models can be used in addition or alternatively to transformer models, including other forms of models which leverage self-attention.

The system or method can use a multimodal alignment prediction model (MAP) for the block-level model. The MAP model can have a set of candidate images sampled from a minibatch. The MAP model can sample and swap the candidate images with images in the document. The sampled and swapped images can then be processed to determine if the processed CLS output is aligned or misaligned.

The block-level representations at each CLS position can be pooled for processing with the document-level model. The document-level model can include an encoding model with a transformer and a convolutional neural network.

The output of the VL transformer and the pooling can be processed by the HVL transformer. The HVL transformer can focus on block local connections. In particular, adjacent relationships between neighboring blocks can be recognized and embedded. Furthermore, the document-level model may further utilize a document-level attention mask. With respect to the CLS tokenization, the neighboring blocks may be processed by the attention mask model together in different combinations during processing of the document. In some implementations, the attention masks may be smoothened by adding 0.01.

Pre-training of the document processing model can include block-ordering prediction. The block-ordering prediction can be trained using ground truth data. The document-level model may use the HVL transformer to predict the block-ordering. The predicted block-ordering can then be compared to the ground truth data of how the blocks were originally ordered.

The document processing model may also be trained with block masked learning, or block MLM. The HVL transformer of the document-level model may output a block prediction which can be compared to candidate blocks. Ground truth data and other prediction data may be used to evaluate the HVL transformer prediction. The training may be run iteratively to allow the model to make accurate predictions. The block MLM may include masking a block-level representation before the document-level processing. The document-level encoder model can generate a text prediction based on a set of candidate blocks provided. The most suitable block may be determined from the set of blocks. The text prediction may be evaluated with a loss function, and the resulting evaluation may be used to perform adjustments in the parameters of the document-level encoder model and/or block-level encoder model(s).

Pre-training of the document processing model can also include image suggestion prediction. The CLS may be processed with the VL transformer and the HVL transformer, and the resulting output can be compared against a set of candidate images. The trained system can use the CLS and the set of candidate images to suggest a prediction image. The system or method may utilize layout-aware content suggestion and multilingual transfer learning. The layout-aware content suggestion can be further used for image suggestion and as an edit assistant. The multilingual transfer learning can be utilized for Wiki category classification. The image suggestion prediction may include masking one or more images in a media block before block-level processing. The document-level encoder model can generate an image prediction based on a set of candidate blocks provided. The most suitable block may be determined from the set of blocks. The image prediction may be evaluated with a loss function, and the resulting evaluation may be used to perform adjustments in the parameters of the document-level encoder model and/or block-level encoder model(s).

The systems and methods can utilize a variety of model variants and baselines. The system or method may be unimodal or multimodal. In some implementations, the system or method may use a single-layer, and in other implementations, the system or method may be multi-layered. The block information being processed may vary in different implementations. The system or method may be transformer-based, convolutional neural network based, or based in another model architecture.

The system or method can use optical character recognition for pre-processing. The system or method may use a convolutional neural network for image encoding. In some implementations, the processed text data and the processed image data can be concatenated before being processed by the HVL transformer.

An implementation using a convolutional neural network baseline can use an adapted BERT grid to generate an input for the document-level model. The document-level model in this implementation may include a convolutional neural network that can serialize back.

The systems and methods disclosed herein can use meta information (e.g., HTML tags) to collect organic text components and image components. In some implementations, the systems and methods may include the processing of meta information instead of using an OCR engine to process a document.

The systems and methods may process image data during document processing. The systems and methods may process images with text blocks, which can allow for the consideration of the relationship among different text blocks and images in the documents.

The systems and methods can be used to learn general document representations. Moreover, the systems and methods can be used on various downstream tasks. The document representation may be used as a search query to find other relevant documents. In some implementations, the document representation may be stored in a searchable database. In some implementations, the document representation may include a document summary. In this way, a compressed representation of a document may be stored, reducing memory footprint and improving computational efficiency.

The systems and methods can use a variety of training techniques for both block-level and document-level pre-training. One example method for pretraining can involve masking blocks. For example, a method for pretraining can include obtaining a set of media training blocks from a set of training documents. In some implementations, the set of media training blocks can include images from the training documents. The method can include masking one or more images of a media training block to obtain a masked training block. The method can include processing the plurality of media training blocks with the machine-learned block-level encoding model to generate a respective plurality of media block representations. In some implementations, the media block representation for the masked training block can include a prediction output that can include a predicted similarity between the masked training block and each of a plurality of additional masked training blocks from the training batch. In some implementations, the method can include evaluating a pre-training loss function that evaluates a difference between the prediction output and ground truth data associated with the masked training block and the plurality of additional masked training blocks. The method can include adjusting one or more parameters of the machine-learned semantic document encoding model based at least in part on the pre-training loss function.

The systems and methods of the present disclosure provide a number of technical effects and benefits. As one example, the system and methods can utilize encoder models to process documents to output representations that take layout, style, and multimedia into account. The systems and methods can generate document summaries, document classifications, or document search queries. Furthermore, the systems and methods can process both images and text to provide a multimodal model that can factor in the importance of multimedia. As the systems and methods can generate document summaries, document classifications, and document search queries, the systems and methods can be used to generate smaller, searchable data sets, which can decrease the computing power needed for searching for documents, while providing improved (e.g., more accurate or relevant) search results.

Another technical benefit of the systems and methods of the present disclosure is the ability to factor in spatial layout, style, font, and color. Technical properties of the document may be determined and ultimately used in the determination of the document representation of the document. The systems and methods can consider these features to determine relative importance in the document of certain content to better understand the document. The better understanding can lead to better document representations, which can lead to generating better document summaries and better document classifications.

With reference now to the Figures, example embodiments of the present disclosure will be discussed in further detail.

Example Devices and Systems

FIG. 1A depicts a block diagram of an example computing system 100 that performs document processing according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more document processing models 120. For example, the document processing models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example document processing models 120 are discussed with reference to FIGS. 2, 4A-4D, and 5.

In some implementations, the one or more document processing models 120 can be received from the server computing system 130 over network 180, stored in the user computing device memory 114, and then used or otherwise implemented by the one or more processors 112. In some implementations, the user computing device 102 can implement multiple parallel instances of a single document processing model 120 (e.g., to perform parallel document processing across multiple instances of indexing documents).

More particularly, the models may be trained on ground truth data, manually generated document representations, or other sets of data. For example, the block-level models can be trained with semantic mask training on ground truth data. Furthermore, the block order prediction of the document-level model can be trained by taking ground truth document data, replacing a block with a zero tensor block, determining what ground truth block belongs in place of the zero tensor block, and evaluating the block ordering with a loss function. One or more parameters of the block-level model and/or document-level model can be modified based on these training methods using a loss function for evaluation.

Additionally or alternatively, one or more document processing models 140 can be included in or otherwise stored and implemented by the server computing system 130 that communicates with the user computing device 102 according to a client-server relationship. For example, the document processing models 140 can be implemented by the server computing system 140 as a portion of a web service (e.g., a document summarization or document representation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned document processing models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 and 4A-4D.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the document processing models 120 and/or 140 based on a set of training data 162. The training data 162 can include, for example, ground truth data to be masked, processed, and evaluated.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). In another example, the task may comprise generating an embedding for input data (e.g. input visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
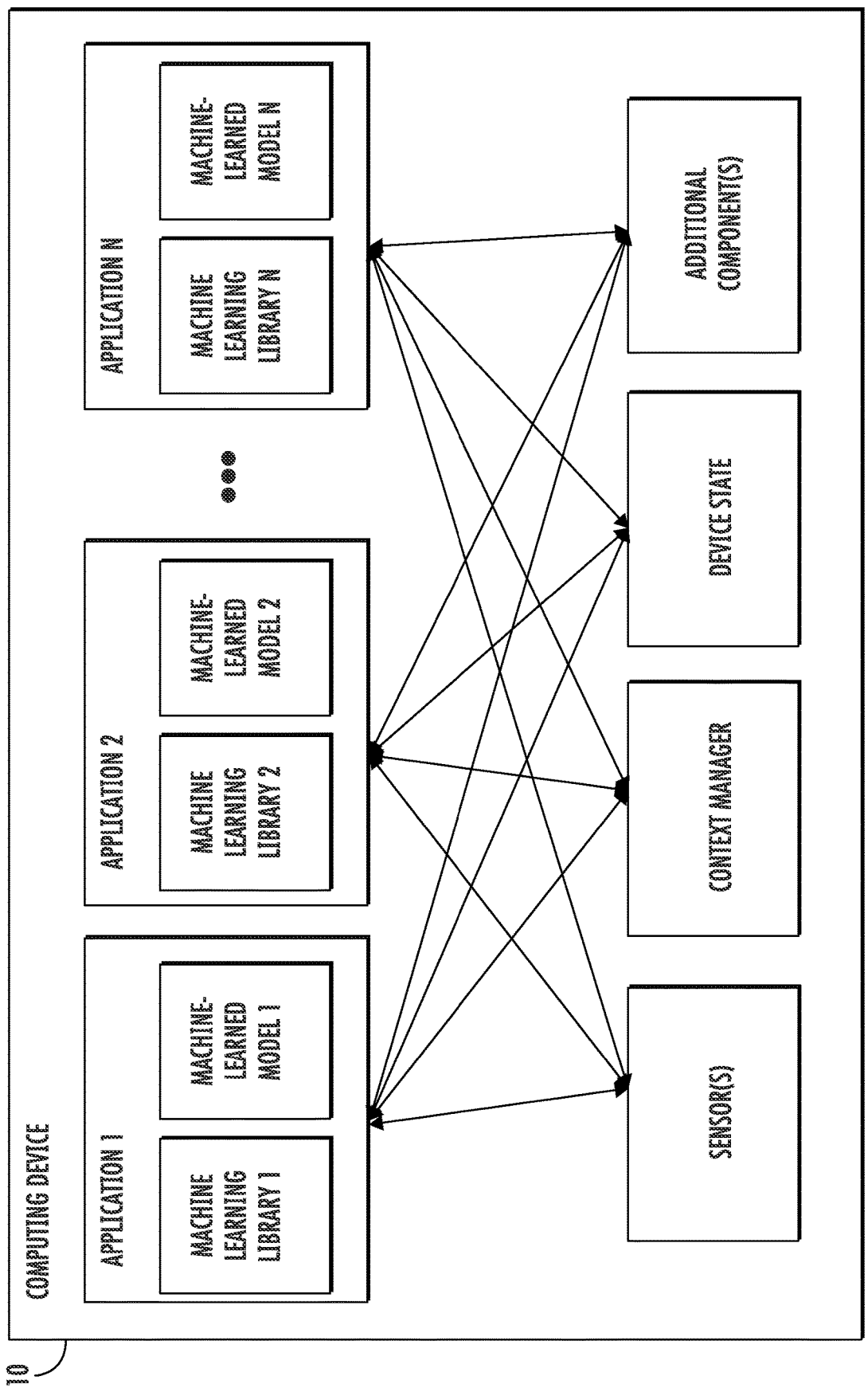
FIG. 1B depicts a block diagram of an example computing device that performs document processing according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
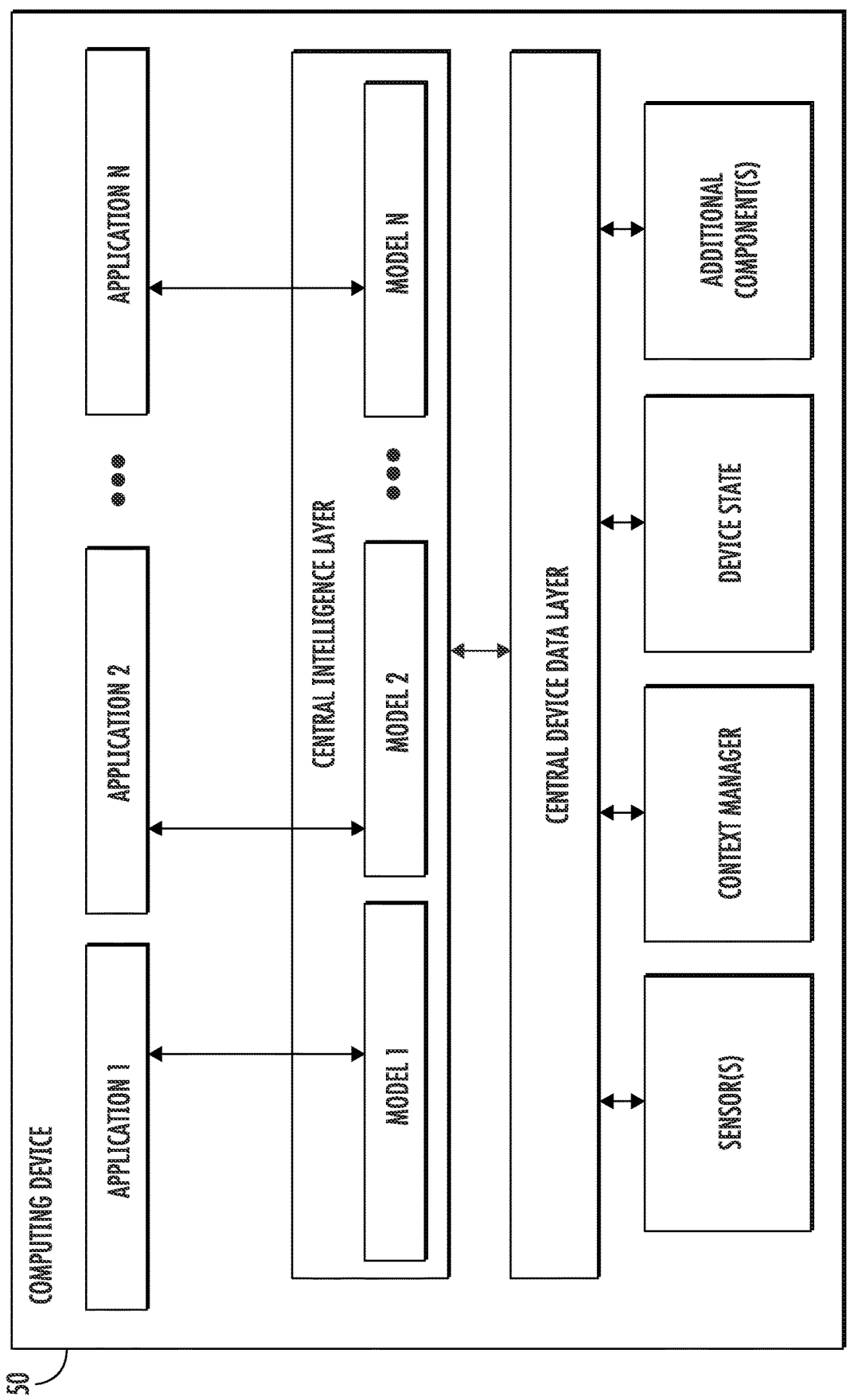
FIG. 1C depicts a block diagram of an example computing device that performs document processing according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

In some implementations, the system can utilize the layout to better understand the document. The layout can be obtained by an in-house document parsing tool, which can primarily handle HTML formatted web-page documents. The system can use a document tokenizer to tokenize, or parse, a web page-document into several small content blocks. A content block can be a small proportion of the document which shows a clear spatial boundary to other content blocks. Each block can consist of features including, but not limited to, block position, block type, block attributes, and multimedia.

The block position can include the 2D real valued position of the bounding box which can encompass the block within the document, represented by a coordinate tuple of (upper-left corner, bottom-right corner). The tokenizer can normalize each of the XY coordinates to $\in [0,1]$.

The block type can include the semantic type of the content presented in the block, such as header, paragraph, images, list (bullet-items), and table. In some implementations, the document tokenizer can define 14 different block types (e.g., header, paragraph, list, table, image, caption, and padding block).

The block attributes can be defined for blocks comprising textual contents. The block attributes can be visual presentations of text. Two example types of attributes that can be generated by tokenizer are: (1) scalar typed, such as font-size, which can be normalized to $\in [0, 1]$ with 1 indicating the largest possible font-size, and (2) binary-typed, such as if the text is bold, italic, or underlined.

In some implementations, the blocks can include multimedia contents such as images, thumbnails, and videos.

Layout can be defined as the structural presentation of the tokenized content blocks (i.e. their relative positions and orders, and the attributional features of the textual contents within each block). In some implementations, the system can prepare the input representation to the models, by first sorting the tokenized content blocks, with respect to the two dimensional coordinates of their upper-left corners. The system may first sort the Y-axis and then the X-axis. The system may put greater emphasis on the vertical order compared to the horizontal order. The sorted blocks can be serialized in a zigzag fashion for the models to take as inputs.

The system framework can aim to: (1) model the inherent hierarchical formulation of document layouts, and (2) exploit the structure alongside the actual contents of a document to learn to generate the document representation.

The system can have two levels for the layout hierarchical formulation. In particular, the lower-level, or block-level, of the hierarchy can refer to the contents of a block such as text or images, while the higher-level, or the document-level, can be concerned with how the blocks are spatially structured. The system framework can include two cascaded transformers taking different levels of inputs of a given document. The block-level model can take the raw parsed contents as inputs, where each content block can be placed at its serialized sorted position (represented by block-segment-id). Each block can contain the textual contents and potentially also a few images (can be more than one), making the block-level model inherently multimodal. Each block $blk_i$ can be prepended with a $CLS_i$ special token for indicating the boundary of block contents. The system can also prepend a global-CLS token at the beginning of the inputs. The document-level model can then take the block-level representations $blkh_i$ as inputs (i.e. the output representations of the block-level model at each $CLS_i$ position of $blk_i$).

The textual input contents can be tokenized by a WordPiece tokenizer. Each block can be attached with a block-segment-id indexed by a serialized sorted position, starting with 1, where 0 can be used for the global-CLS position. The system can map and round each real-valued font-size to an integer scalar $\in [0, 10]$. The boldness, underline, and italic can be simply represented as binary values $\in \{0, 1\}$. In some implementations, the system can supplement a binary embedding indicating the modality. The overall input representation for each token position can be as follows:

$$embd = embd_{WordPiece}\ embd_{block\_seg\_id}\ embd_{type} + embd_{modality}\ embd_{attr},$$

where the $embd_{attr}$ denotes the element-wise summed embedding from all the textual attributes. For each block, the system can leave a design choice to truncate the block's contents with a maximally allowed token length, as well as a maximally allowed number of images.

The image contents can be first fed to a convolutional neural network (CNN), followed by a transformation fully-connected (FC) layer to align the resulting visual embedding to the same size of the textual token embedding. In some implementations, the transformation fully-connected layer can be a multi-layer perceptron (MLP) layer. For documents without any image contents, the system can pad the inputs with zero-image tensors, and the attention mask in the block-level model can be adjusted not to attend to those input positions.

The block-level training objectives can aim to capture the finer-grained linguistics, visual information, and the ability to handle multimodal inputs, while the document-level training objectives can aim to exploit the structural interactions among the contents at the block-level.

Block-level objectives for the block-level model can include the use of masked language modeling (MLM) and multimodal alignments (ITM).

Following a BERT transformer and several multimodal BERT models, the system can apply the MLM objective to further finetune the linguistics ability on the dataset, and further apply the MLM objective to fine-tune language modeling with image modality.

To further sharpen the model capability of handling multimodal inputs, the system can adapt the image-text matching (ITM) prediction. In particular, for a given document d containing multiple images, the system may sample a few candidate images from other documents $\{d'\}$ within the same mini-batch during training and swap them with some images in d with certain probabilities. The model can then be prompted to predict whether the textual contents match the resulting image sequences as binary classification.

Document-level objectives for the document-level model can include block-ordering predictions (B-ORD), block-MLM (B-MLM), and image fitting (IMG-FIT).

Figure 4A:
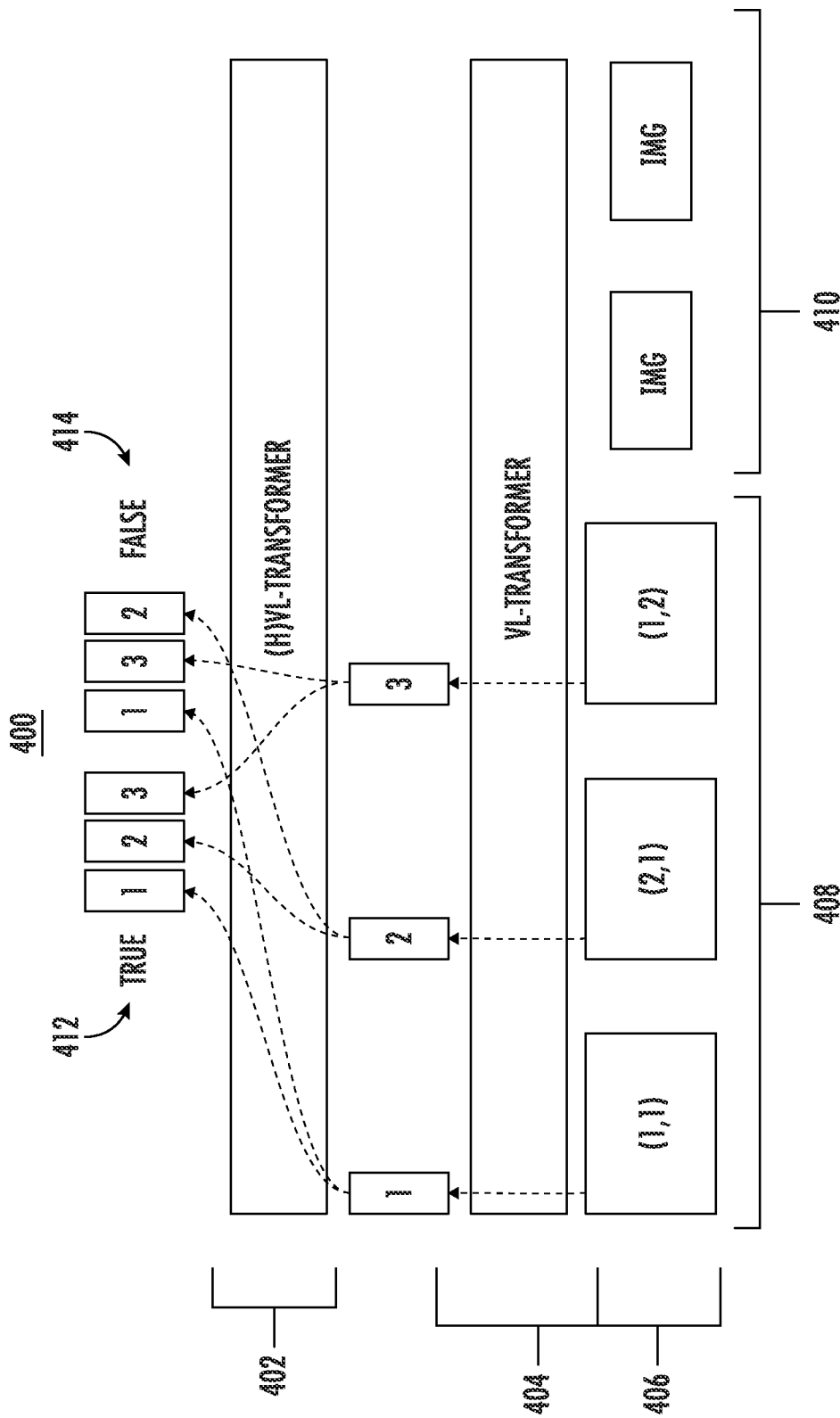
FIG. 4A depicts a block diagram of an example document processing model according to example embodiments of the present disclosure.

For block-ordering predictions, two input blocks can be randomly selected and swapped (with certain probability remained) in their serialized order when inputting into the block-level model. An MLP, which can take the output representation at the global CLS position $out_{global-CLS}$, as input, can be trained to make the binary predictions on whether the input contents are following a proper order (i.e. whether the two selected blocks are swapped or kept within the original order). The block segment-IDs for the two selected blocks can be replaced by a padding value to prevent the leak of the original order. The block-ordering predictions objective can be denoted as $L_{b-ord}$. An example implementation of the block-ordering prediction pretraining objective is depicted in FIG. 4A.

Figure 4B:
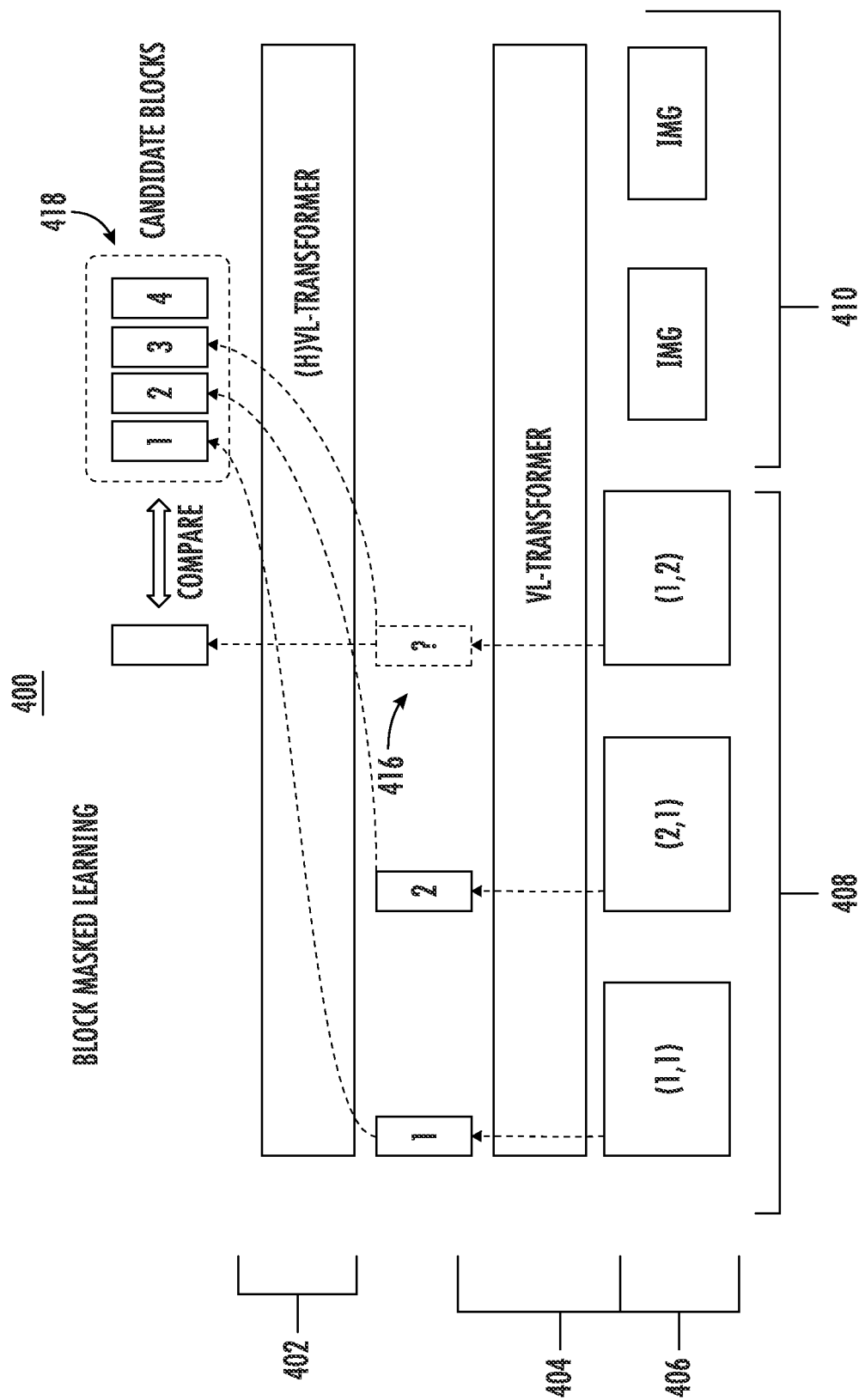
FIG. 4B depicts a block diagram of an example document processing model according to example embodiments of the present disclosure.

For block-MLM, one or more textual blocks can be masked out at their block-level representations, $blkh_i$, by replacing them with zero-tensors. The objective can prompt the model to select the most suitable block for the masked position from a given set of candidate blocks, where the candidate set can be constructed by collecting the blocks from all the documents within a mini-batch during training (with ground truth blocks deliberately included). An MLP layer can then take the concatenation of the output representations of the masked positions and the block-level representations of the candidate blocks (i.e. concat ($out_{masked}$, $blkh_i$, $blkh_j$, ... )), and can output the classification result of the index to the most suitable block. Since this objective can be performed as a classification task, which can include a fixed number of candidates, in practice the system can truncate the candidates to a fixed number of blocks (ground truth ones may be guaranteed to be included). The block-MLM objective can be denoted as $L_{b-mlm}$. An example implementation of the block-MLM pretraining objective is depicted in FIG. 4B.

Figure 4C:
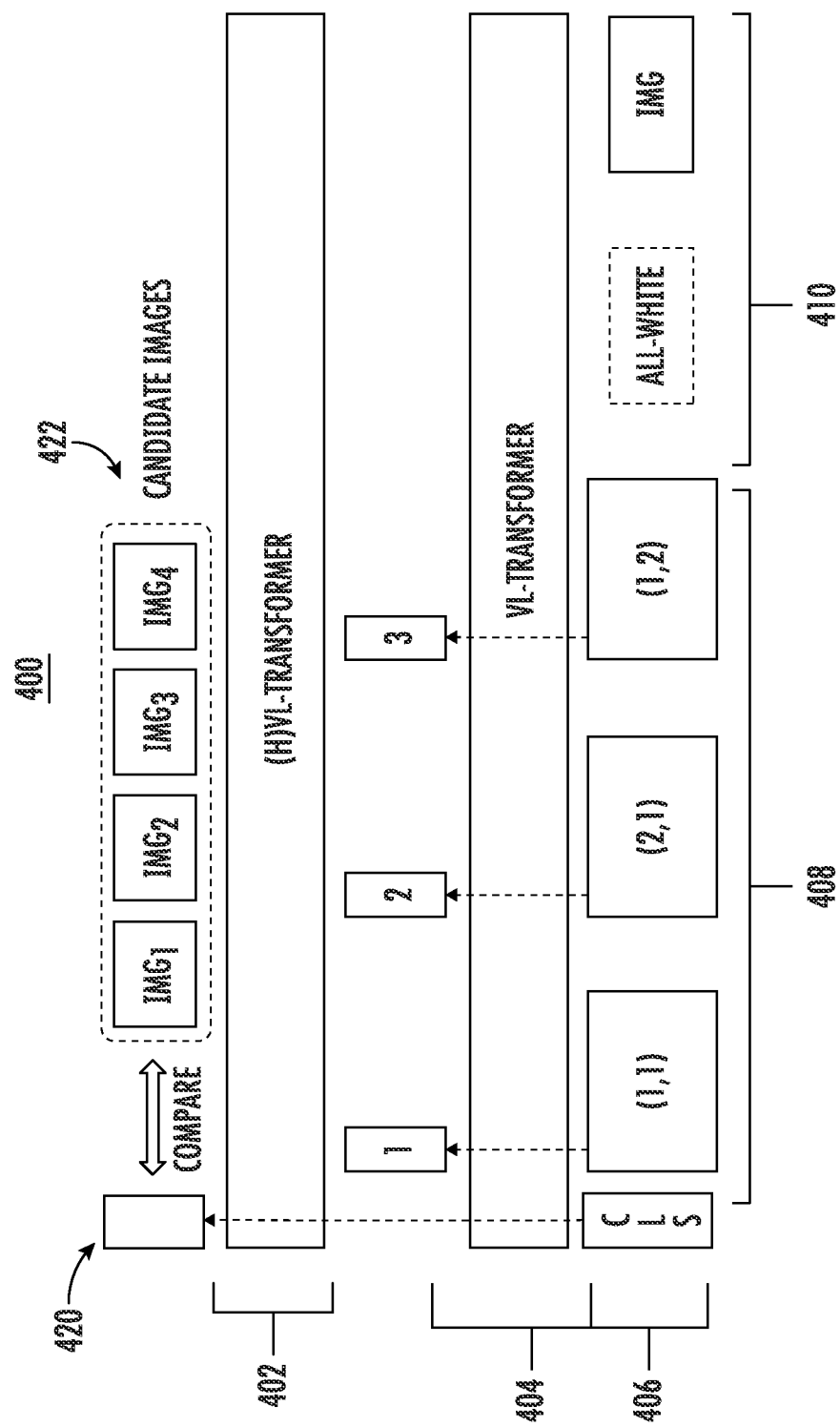
FIG. 4C depicts a block diagram of an example document processing model according to example embodiments of the present disclosure.

For image fitting, one or more images can be masked out by replacing them with a mask-image-token, which can be a white image in some implementations. Image fitting can include the model selecting the most suitable images from a set of candidate images for the masked-out images. Similar to block-MLM, the candidate set can be constructed by collecting the images from all the documents within a mini-batch during training, and a classification MLP layer can be applied to predict the most suitable ones. The input to the MLP layer for the masked image in the i-th block can be: concat (out$_{global\_CLS}$, out$_{blk,i}$, embd$_{img,1}$, embd$_{img,2}$, . . . ), where embd$_{img,j}$ is the visual embedding of the j-th image candidate. In some implementations, the system can add the output representation at the global-CLS$_{position}$ to incorporate modeling the general trends of how the images can be positioned within a document as the system aggregates information from each block. In addition, a batch-level mask can be applied to filter out the losses of those data entries (documents) without any image contents. Image fitting can be denoted as L$_{img-fit}$. An example implementation of the image fitting pretraining objective is depicted in FIG. 4C.

The system framework can be jointly trained with the low and high-level objectives, and hence a linear combination of the following: $L_{LAMPreT} = \lambda L_{mlm} + \Delta_2 L_{itm} + \lambda_3 L_{b-ord} + \Delta_4 L_{b-mlm} + \Delta_5 L_{img-fit}$, where $\lambda_1$'s are tunable hyperparameters, and all the losses L can be classification cross-entropy losses. In some implementations, all the λs are 1.

Figure 2:
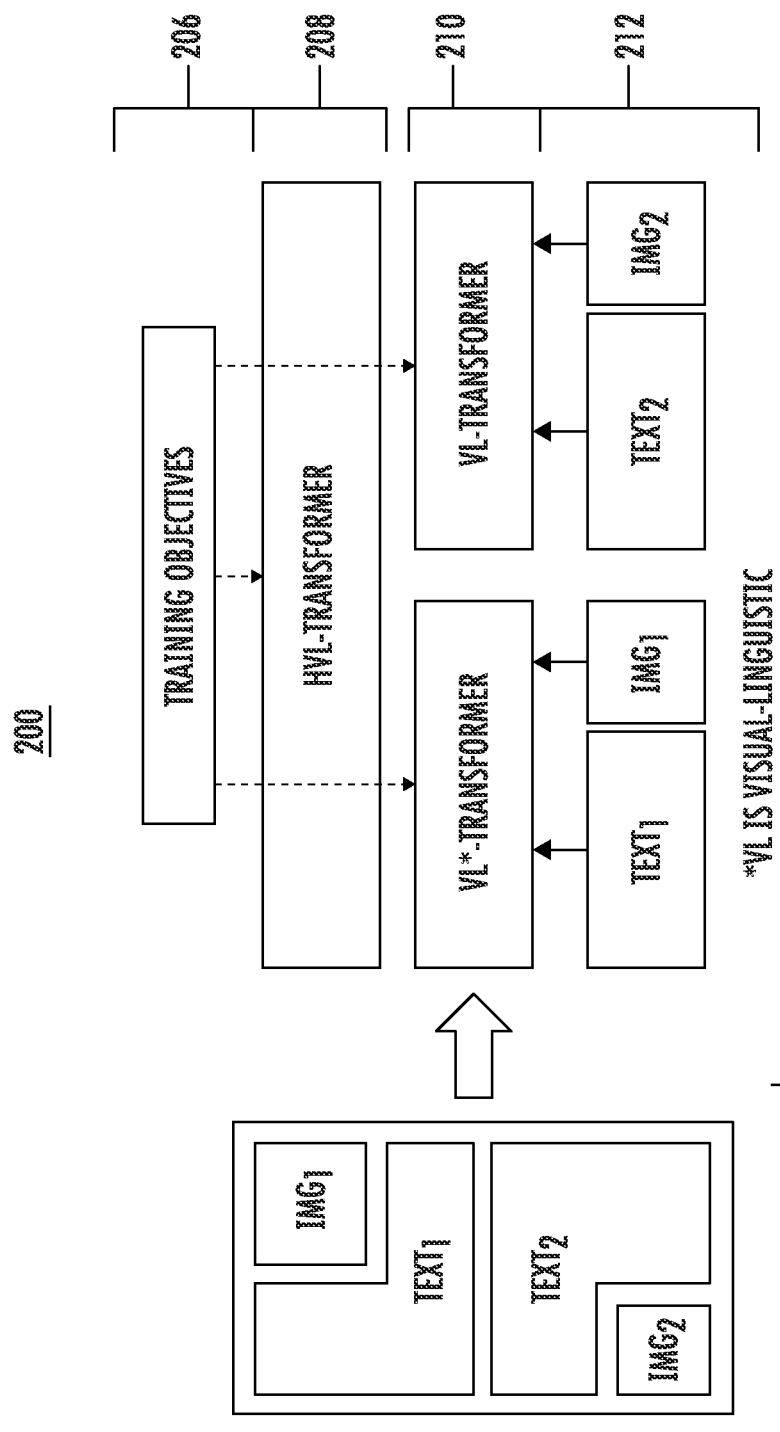
FIG. 2 depicts a block diagram of an example document processing model according to example embodiments of the present disclosure.

FIG. 2 depicts a block diagram of an example document processing model 200 according to example embodiments of the present disclosure. In some implementations, the document processing model 200 is trained to receive a set of input data 212 descriptive of a document and, as a result of receipt of the input data 212, provide output data that can include a document representation. Thus, in some implementations, the document processing model 200 can include a block-level model 210 that can be operable to process portions of the document and a document-level model 208 that can be operable to process the relationships between the portions of the document.

The document processing model 200 can process a document 202 with one or more text blocks and one or more image blocks. The plurality of blocks 212 can be processed individually or in groups by a block-level model 210. In some implementations, the block-level model 210 may include one or more visual-linguistic transformers. The output of the block-level model 210 can include block-level representations, which can be processed by the document-level model 208 to generate a document-level representation. In some implementations, the document-level model 208 can also be a visual-linguistic transformer. The resulting document-level representation can be used to generate document summaries. Moreover, the document-level representation may include a document classification and may be used to index the document in a search database.

The document processing model 200 can be trained using training objectives 206. The training objectives 206 can include training the block-level model 210 with a masked language modeling (MLM) loss, while training the document-level model 208 with three layout-aware objectives: block-order predictions, masked block predictions, and image fitting predictions. These pretraining objectives can allow the model to exploit document layout and style when processing the document.

Figure 3:
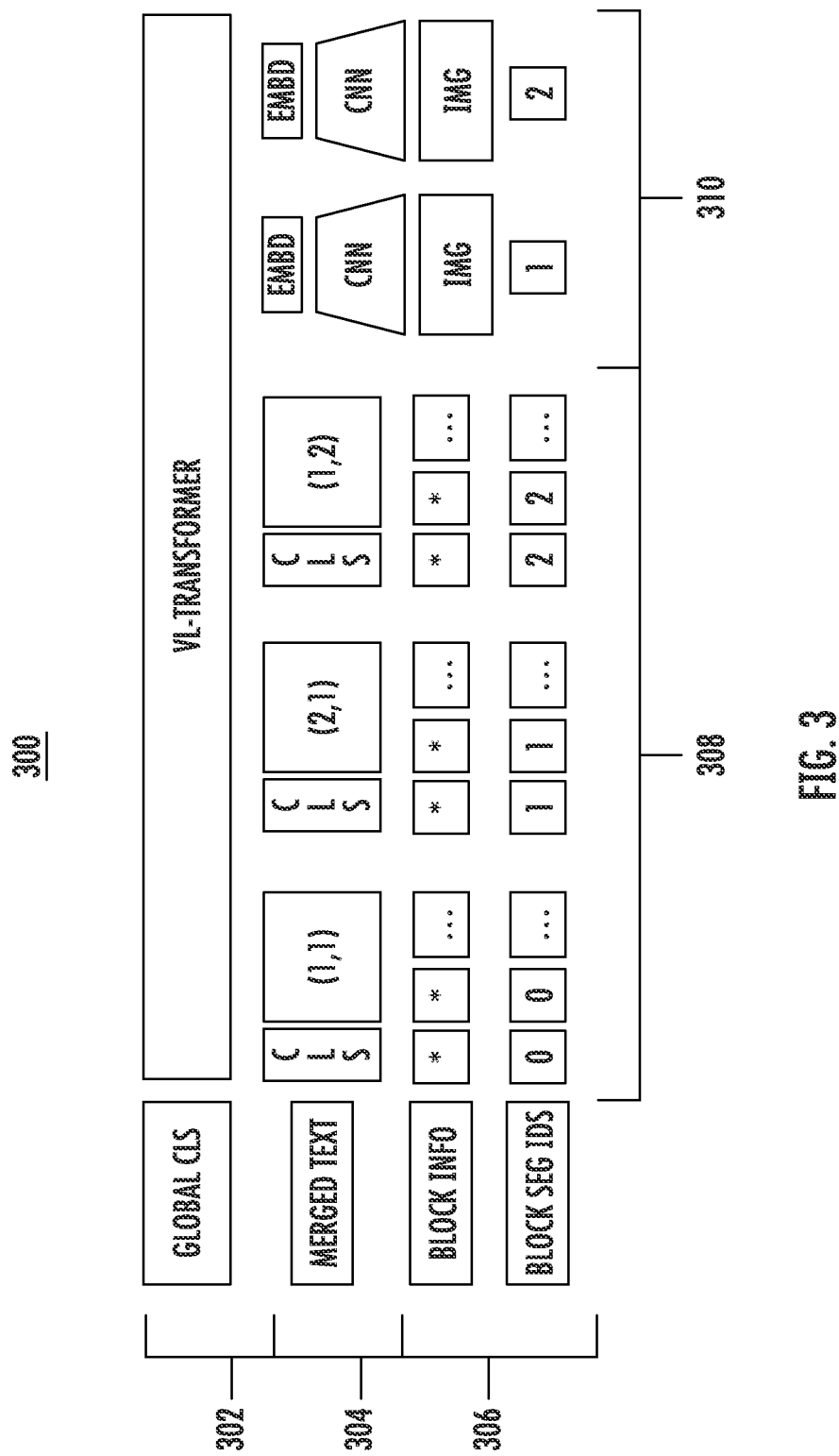
FIG. 3 depicts a block diagram of an example block-level processing model according to example embodiments of the present disclosure.

FIG. 3 depicts a block diagram of an example block-level model 300 according to example embodiments of the present disclosure. The block-level model 300 is similar to block-level model 210 of FIG. 2.

In this implementation, the input is a document with both text blocks 308 and image blocks 310. The text data 308 can include block segment IDs, block info 306, and merged text 304. The block info and block segment IDs can include information on whether text is bolded, italicized, larger in size, or of a different color. For example, bolded text may be given a 1, while non-bolded text may be given a 0. Moreover, text size may be coded in binary or in a spectrum proportionate to varying sizes. The merged text 304 can include CLS tokens and block layout data. For example, the top left block in the document may be given the ordered pair (1,1). In this implementation, the image data 310 can be processed as blocks with a convolutional neural network and an embedding model.

In this implementation, the block-level model 302 can process text data 308 and image data 310 to generate block-level representations with each block having a respective block-level representation. The block-level model 302 may include Global CLS processing and a visual-linguistics transformer. The block-level representations may be configured to be processed by a document-level model.

FIGS. 4A-4D depict block diagrams of example document processing models 400 according to example embodiments of the present disclosure. The document processing models 400 are similar to the document processing model 200 of FIG. 2.

More particularly, FIGS. 4A-4C depict example document-level objectives. For example, FIG. 4A depicts an example block-ordering prediction objective. FIG. 4B depicts an example block masked learning objective. FIG. 4C depicts an example image suggestion prediction objective.

In these implementations, FIGS. 4A-4C include text blocks 408 and image blocks 410 that are processed as input 406 for the document processing model 400. The document processing model 400 can include a block-level model 404 and a document-level model 402. The block-level model 404 may include a visual-linguistic transformer, and the document-level model 402 may include a separate visual-linguistic transformer.

As depicted in FIG. 4A, the document-level model 402 can output a document representation that can include a block ordering. The document-level model 402 may be trained with ground truth training blocks to process and output the correct block order. FIG. 4A depicts an example set of outputs. The left output 412 is the correct order, and the right output 414 is incorrect. The model predictions may be evaluated using a loss function, which compares the block-ordering prediction to ground truth training data. The parameters of the document-level model may be modified in response to a prediction similar to the prediction on the right.

As depicted in FIG. 4B, the document-level model 402 can be trained using block masked learning. The input blocks 406 may be first processed by a block-level model 404 to generate block-level representations for each respective input block 406. The block-level representations may then be processed by the document-level model 402 to generate a document-level representation. The block masked learning can include masking a block-level representation 416 by replacing the block-level representation with zero-tensors. The document-level model 402 can be tasked with choosing which of the candidate blocks 418 belongs in the masked position. The candidate blocks 418 can include training blocks from training documents and ground truth blocks from the document being processed. A multilayer perceptron may be used to process a concatenation of the output representations of the masked positions and the block-level representations of the candidate blocks 418 to output classification results. The classification results may be an index of the most suitable blocks. For example, in FIG.

4B, the document-level model 402 may correctly predict candidate block 3 is the most suitable block. The parameters of the document-level model 402 may be modified as the result of the prediction being evaluated with a loss function.

As depicted in FIG. 4C, the document-level model 402 can be trained for image suggestion prediction. Image suggestion prediction may involve replacing an image block with a mask-image token. In some implementations, the mask-image token can be an all-white image. The document-level model 402 can be tasked with determining a most suitable image from the set of candidate images 422 to be placed in place of the mask-image token. The candidate images 422 can include training image blocks from training documents and ground truth image blocks from the document being processed. A multilayer perceptron may be used to process the candidate images 422 to generate image classifications as an index of most suitable images. The Global CLS of the document can also be processed 420 to determine the layout of other images in the document. The image suggestion prediction objective may include a batch-level mask applied to filter out the losses of documents that do not contain images.

Figure 4D:
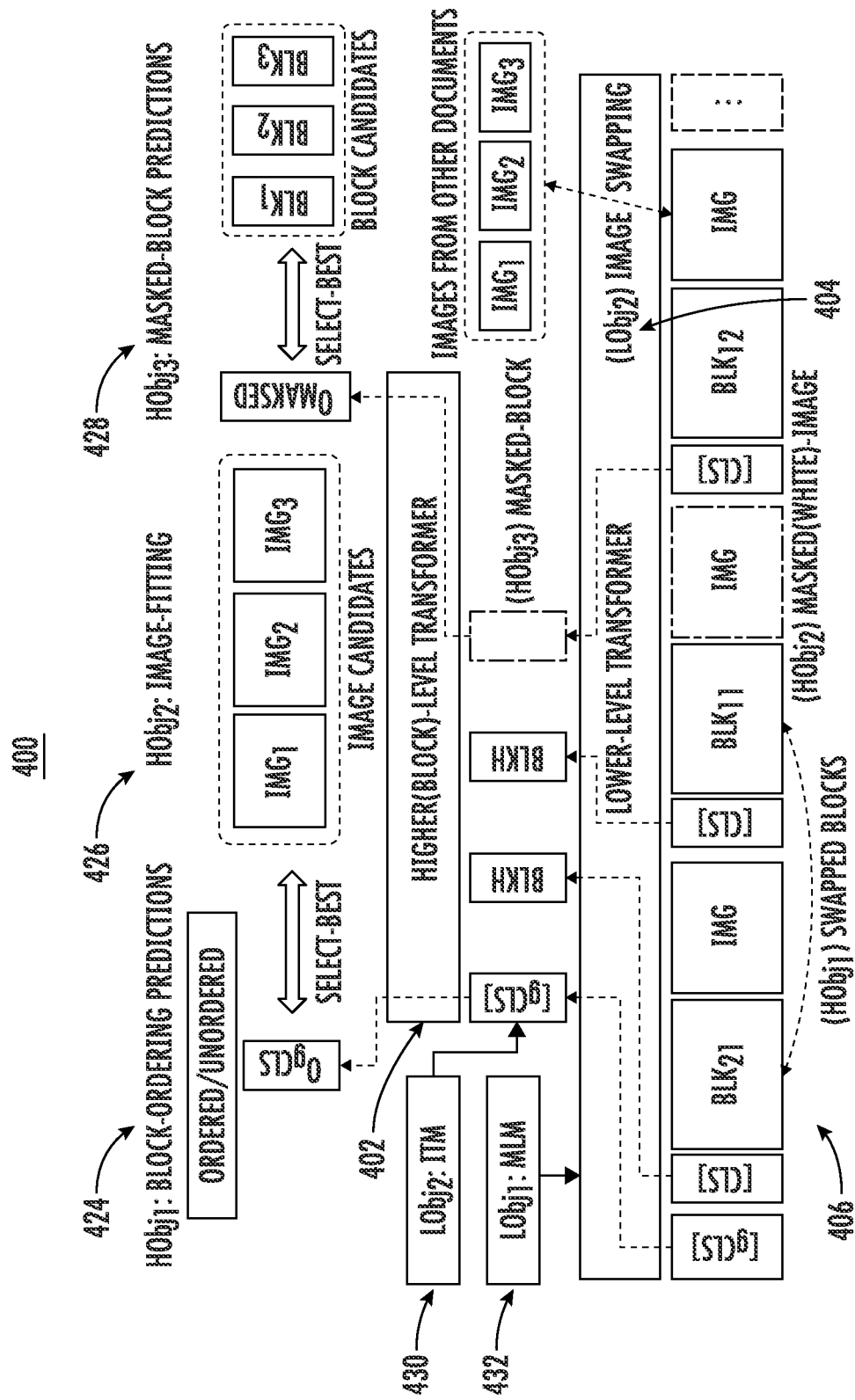
FIG. 4D depicts a block diagram of an example document processing model according to example embodiments of the present disclosure.

FIG. 4D depicts the training objectives of FIGS. 4A-4C along with block-level pretraining objectives. In this implementation, the document processing model 400 includes two block-level objectives (i.e. masked language modeling (MLM) 432 and image-text matching (ITM) 430) and three document-level objectives (i.e. block-ordering predictions (B-ORD) 424, block masked language modeling (B-MLM) 426, and image fitting (IMG-FIT) 428). The pretraining training objectives can allow the document processing model 400 to properly understand the text in a block, understand image context, understand the importance of spatial layout of the blocks, understand the importance of certain text blocks in the scheme of a document, and understand the fit of images in a document.

Figure 5:
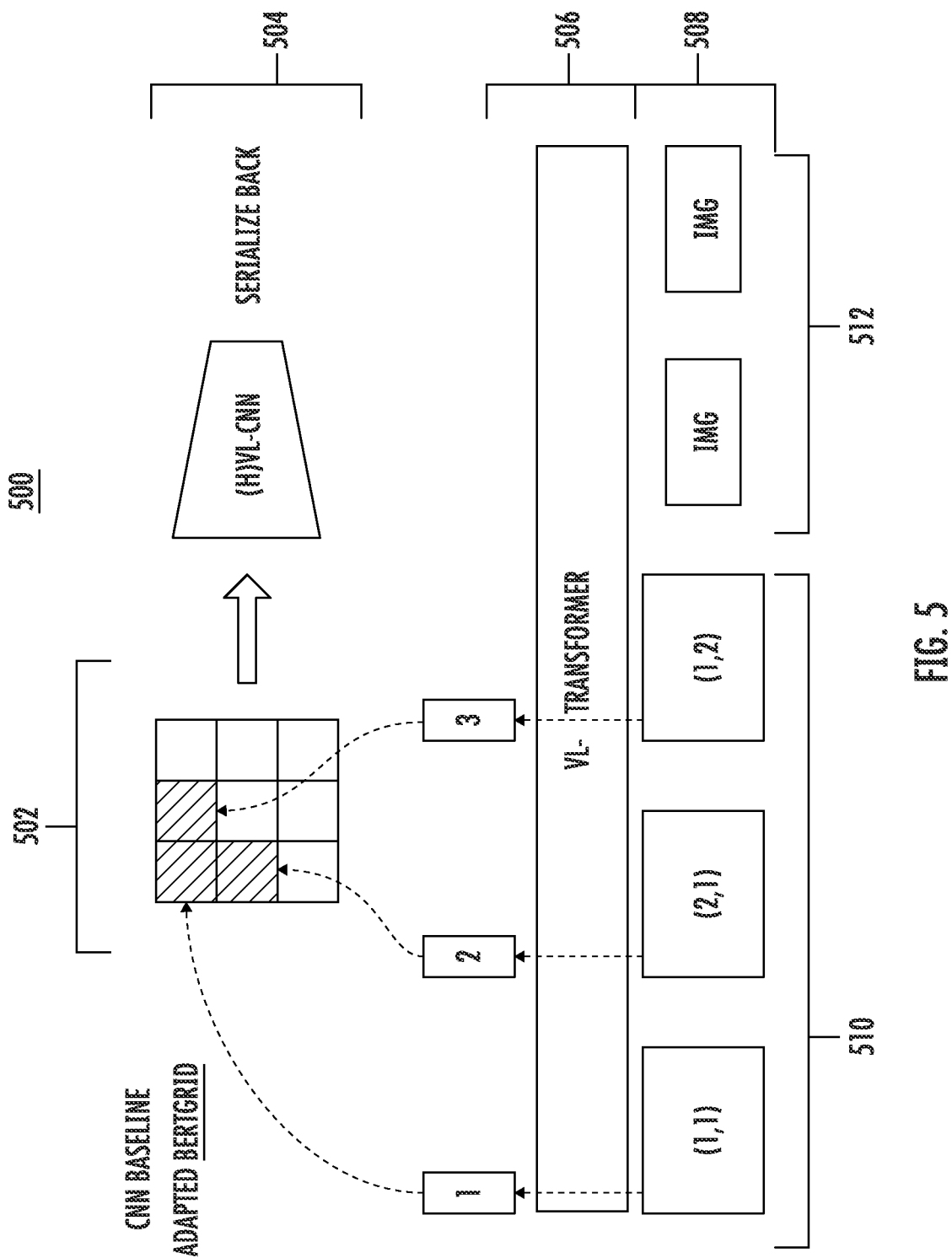
FIG. 5 depicts a block diagram of an example document processing model according to example embodiments of the present disclosure.

FIG. 5 depicts a block diagram of an example document processing model 500 according to example embodiments of the present disclosure. The document processing model 500 is similar to the document processing model 200 of FIG. 2 except that the document processing model 500 further includes a BERTGrid 502 and a convolutional neural network which together operate as a document-level encoder 504 in place of the document-level transformer 208 in FIG. 2.

In this implementation, the input blocks 508 include both image blocks 512 and text blocks 510. The input blocks 508 can be processed by a block-level model 506 to generate block-level representations. In this implementation, the block-level model 506 includes a visual-linguistic transformer.

The block-level representations can then be processed by a document-level model 504 to generate a document-level representation. In this implementation, the document-level model 504 can include processing the block-level representations with a BERTGrid 502 then processing the output with a visual-linguistic convolutional neural network. The BERTGrid paired with visual-linguistic convolutional neural-network can allow the model to serialize back the blocks.

Figure 9A:
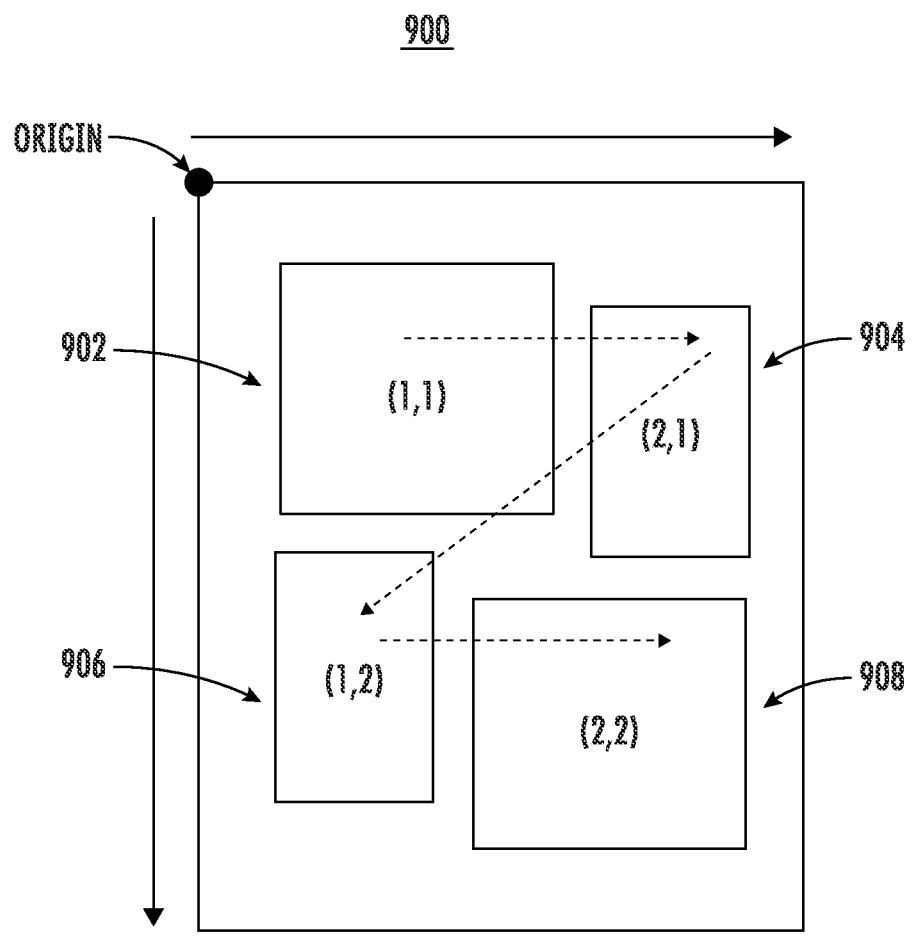
FIG. 9A depicts a block diagram of an example block sorting and serialization model according to example embodiments of the present disclosure.
Figure 9B:
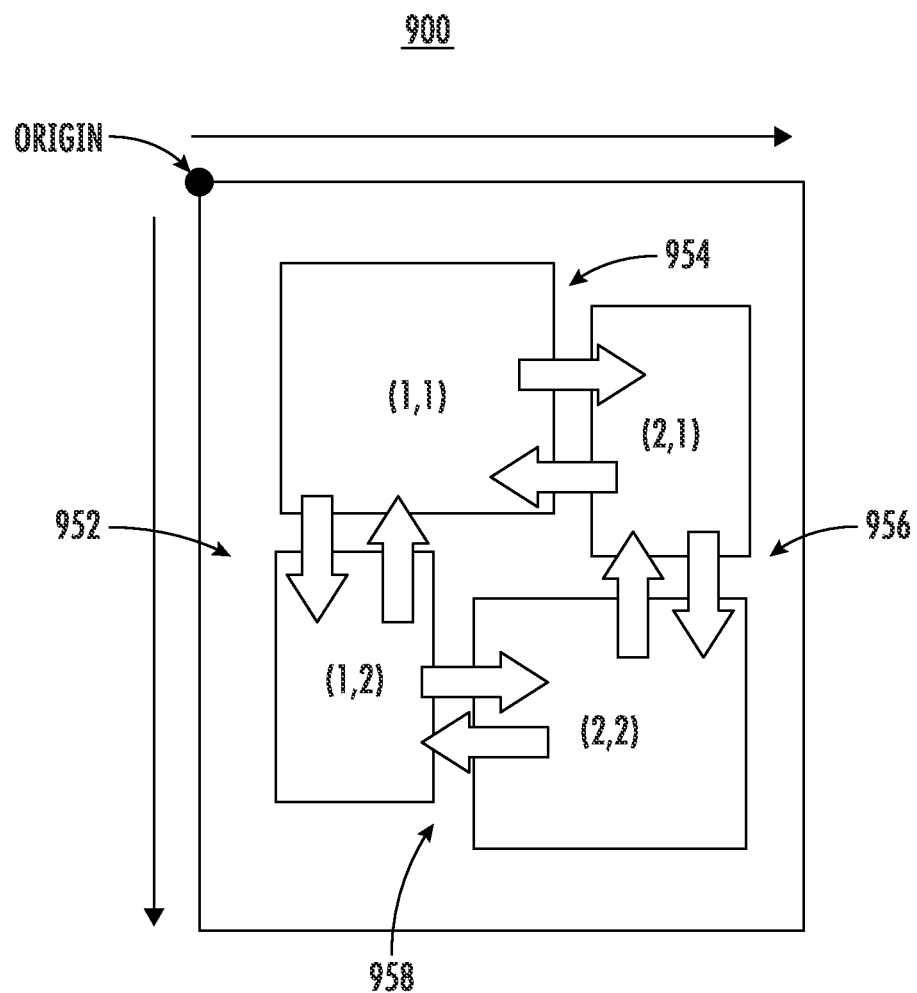
FIG. 9B depicts a block diagram of an example block correlations model according to example embodiments of the present disclosure.

FIGS. 9A-9B depict block diagrams of an example document 900 according to example embodiments of the present disclosure. The document 900 can be processed by the document processing model 200 of FIG. 2 or a variety of other example models described herein.

More particularly, FIG. 9A depicts the block ordering and block serialization of a document. In this implementation, the document 900 consists of four blocks. The blocks can be assigned ordered pairs descriptive of their location in the document. In this implementation, the origin, or starting point, for the ordered pairs is in the top left corner. The blocks can be serialized accordingly. For example, the top left block 902 can be denoted as (1,1), the top right block 904 can be denoted as (2,1), the bottom left block 906 can be denoted as (1,2), the bottom right block 908 can be denoted as (2,2), and so forth. The serialization can further aid the model in being layout-aware.

FIG. 9B depicts the block local connections of a document. The block local connections can aid the document-level model better understand the relationships between blocks. In this implementation, the block local connections includes the adjacent relationships of blocks. For example, the top left block can be adjacent to the bottom left block 952 and the top right block 954, while the bottom right block can be adjacent to the top right block 956 and the bottom left block 958. The block local connections can be important in better understanding what each block means to the document. For example, the top right block may be a table that can be described by the top left block, or alternatively, the top right block can be an image block while the bottom right block can be a caption for the image block. Being aware of the layout and local connections of the document can allow for each individual block and the document as a whole to be better understood.

Figure 10:
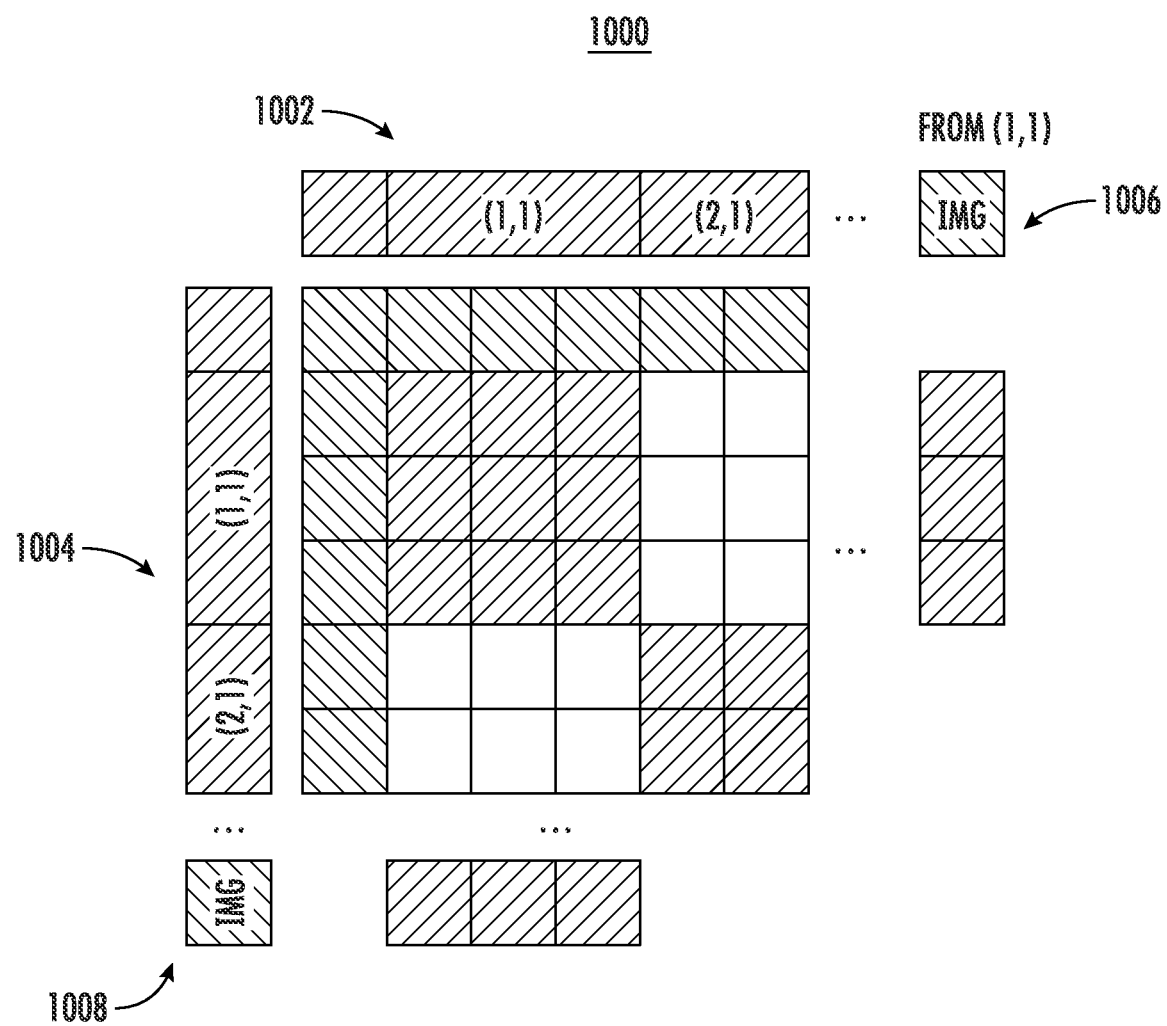
FIG. 10 depicts a block diagram of an example block-level attention mask model according to example embodiments of the present disclosure.
Figure 2:
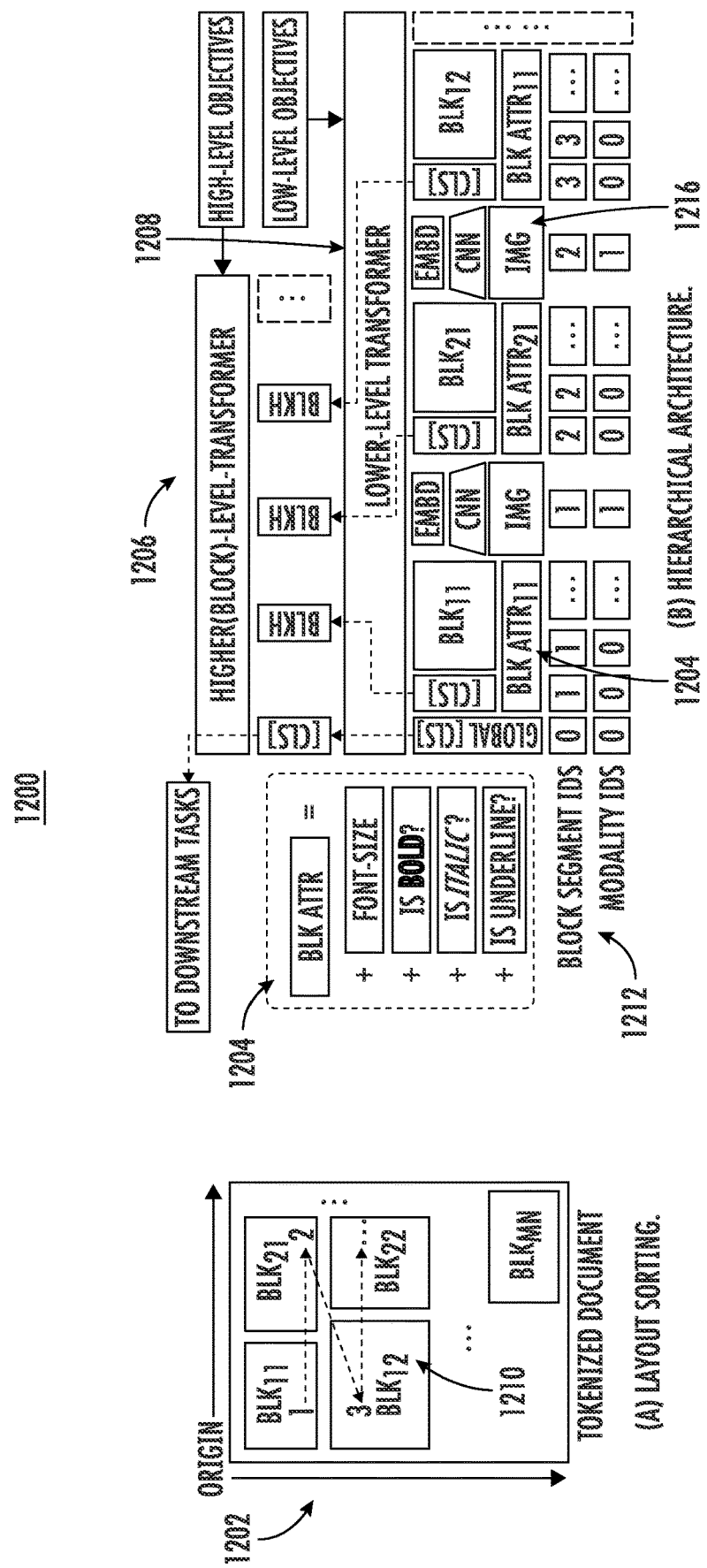

FIG. 10 depicts a block diagram of an example block-level attention mask model 1000 according to example embodiments of the present disclosure. The block-level attention mask model 1000 can be included in the block-level model 210 of FIG. 2.

The block-level attention mask model 1000 can be used to process blocks individually. In some implementations, both text blocks 1002 and image blocks 1006 can be processed with the block-level attention mask model 1000. Each text block 1002 may be processed with attention only to that singular text block data 1004. Each image block 1006 may be processed with attention only to that singular image block data 1008.

FIG. 11 depicts a block diagram of an example document-level attention mask model 1100 according to example embodiments of the present disclosure. The document-level attention mask model 1100 is similar to the block-level attention mask model 1000 of FIG. 10 except that the document-level attention mask model 1100 further focuses on the relationship between blocks.

The document-level attention mask model 1100 can process the blocks and the CLS tokens 1102 as pairs to process block relationships 1104. For example, the top left block and the top right block may be processed as a pair understand inter-block relationships. In some implementations, the model can include variations 1106. In some implementations, the document-level attention masks model may include smoothing the attention masks by adding 0.01.

FIG. 12 depicts a block diagram of an example document processing model 1200 according to example embodiments of the present disclosure. The document processing model 1200 can include obtaining a document 1202, partitioning the document 1202, and processing the document 1202 to generate a document-level representation.

More particularly, in this implementation, the document 1202 is partitioned, and the blocks are sorted and serialized 1210 by a tokenizer. Once the document 1202 has been partitioned and processed by the tokenizer, the blocks and their respective data can be processed by a lower-level model, or block-level model 1208, and a higher-level model, or a document-level model 1206, to generate a document-level representation. In this implementation, both the block-level model 1208 and the document-level model 1206 are transformers. Furthermore, in this implementation, CLS tokens, block attributes 1204, block segment-IDs 1212, and modality IDs can be processed by the block-level model 1208 and the document-level model 1206. The block attributes 1204 can include font-size, a binary bolded value, a binary italics value, and a binary underline value. The block segment-IDs 1212 can be an indicator of an assigned number for the block in regards to all the blocks in the document 1202. Moreover, in this implementation, the image blocks 1216 may be further processed by a convolutional neural network and an embedding model before being processed by the block-level model 1208.

The resulting document-level representation can be used for a variety of downstream tasks.

Example Methods

Figure 6:
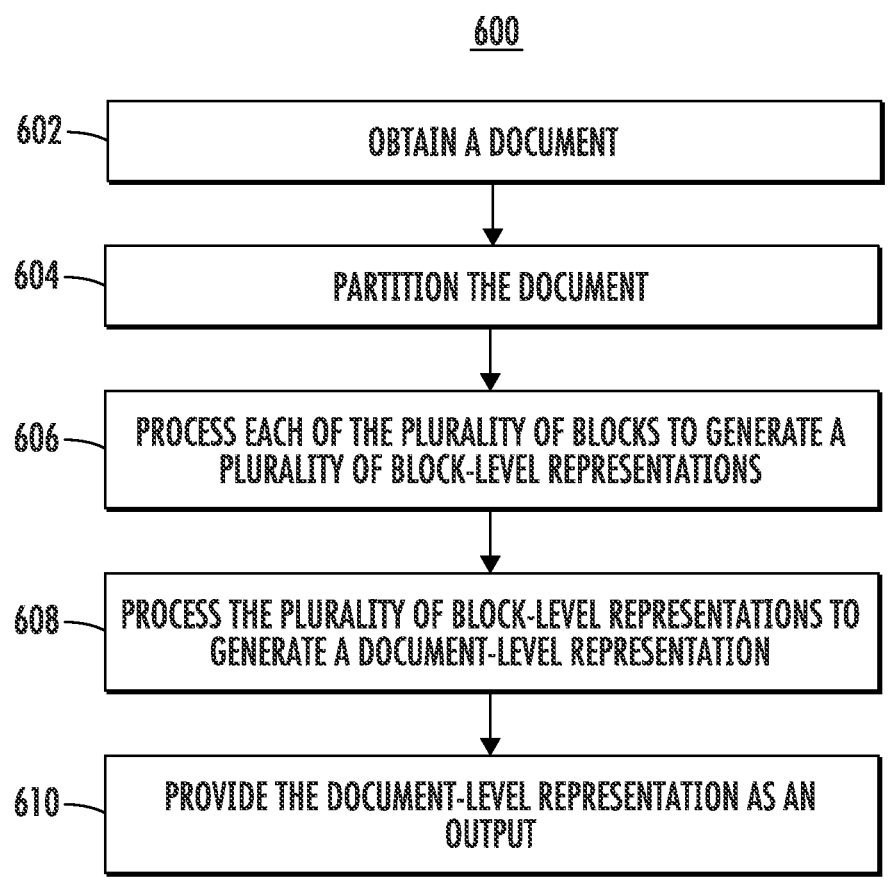
FIG. 6 depicts a flow chart diagram of an example method to perform document processing according to example embodiments of the present disclosure.

FIG. 6 depicts a flow chart diagram of an example method to perform document processing according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a document. The document can include text and images. Furthermore, the document can include layout data descriptive of the layout of text and images in the document. The document may be a webpage, an advertisement, or a variety of other document types.

At 604, the computing system can partition the document. The document can be partitioned into a plurality of blocks based at least in part on the layout data. The blocks can be text blocks, image blocks, or multimodal blocks. The blocks can include groups of text or media with similar style and location in the document.

At 606, the computing system can process each of the plurality of blocks to generate a plurality of block-level representations. The generated block-level representations can correspond respectively to each of the plurality of subsets of the plurality of blocks processed by a block-level model. In some implementations, the block-level model can be a visual-linguistic encoder model. In some implementations, the block-level model can process the plurality of subsets of the plurality of blocks and the layout data associated with the plurality of subsets of the plurality of blocks to generate the block-level representations.

At 608, the computing system can process the plurality of block-level representations to generate a document-level representation. The plurality of block-level representations may be processed by a document-level model to generate the document-level representation. In some implementations, the document-level representation may be a visual-linguistic encoder model.

At 610, the computing system can provide the document-level representation as an output. In some implementations, the document-level representation can include a document summary or document classification. In some implementations, the document-level representation can be used to search for similar documents in a database. For example, the document-level representation may be processed with a search engine to generate a results list, wherein the results list comprises a plurality of additional documents with data related to that of the document.

Figure 7:
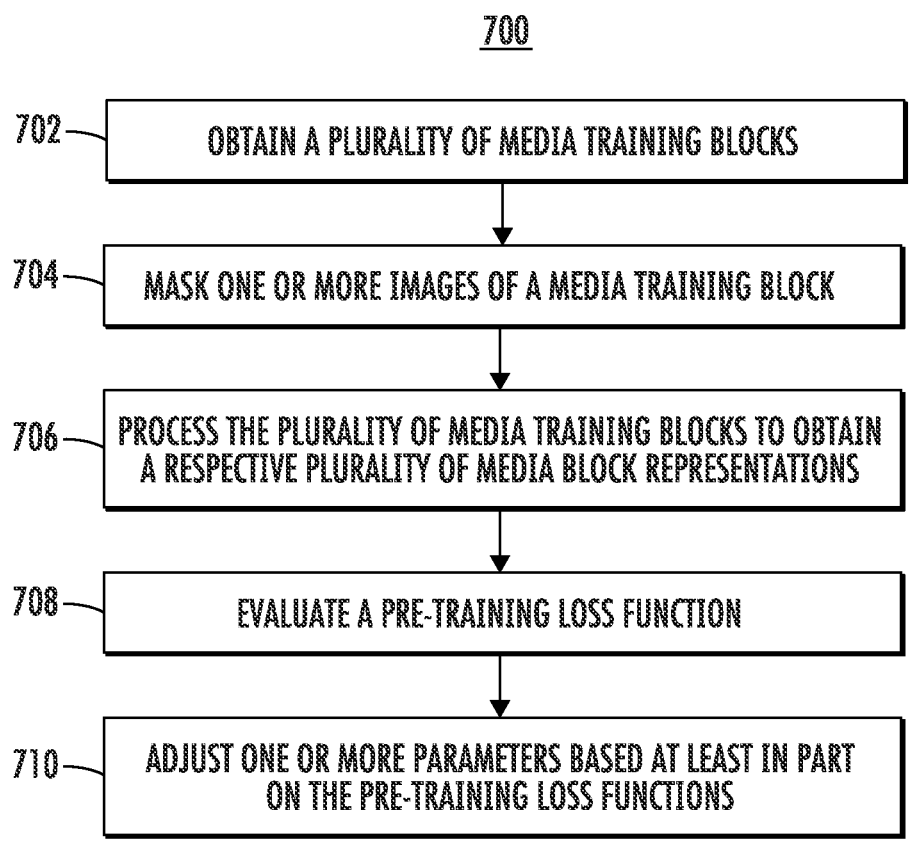
FIG. 7 depicts a flow chart diagram of an example method to train a document processing model according to example embodiments of the present disclosure.

FIG. 7 depicts a flow chart diagram of an example method to perform pretraining according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a plurality of media training blocks. The media training blocks can be obtained from one or more training documents. Furthermore, the media training blocks can include one or more images from the one or more training documents.

At 704, the computing system can mask one or more images of the media training block. Masking the one or more images of a media training block can generate a masked training block. The masked training block may include a mask-image-token or an all-white image.

At 706, the computing system can process the plurality of media training blocks to obtain a respective plurality of media block representations. In some implementations, the processing of the plurality of media training blocks to obtain a respective plurality of media block representations may involve using a machine-learned semantic document encoding model for the processing. The media block representations for the masked training block can include a prediction output. Moreover, the prediction output may include a predicted similarity between the masked training block and each of a plurality of additional masked training blocks from the training batch. The prediction output may select a replacement image from a pool of candidate images generated from the masked training block and each of a plurality of additional masked training blocks from the training batch.

At 708, the computing system can evaluate a pre-training loss function. In some implementations, the pre-training loss function can be used to evaluate a difference between the prediction output and ground truth data associated with the masked training block and the plurality of additional masked training blocks.

At 710, the computing system can adjust one or more parameters based at least in part on the pre-training loss function. The one or more parameters being adjusted can be the one or more parameters of the machine-learned semantic document encoding model.

Figure 8:
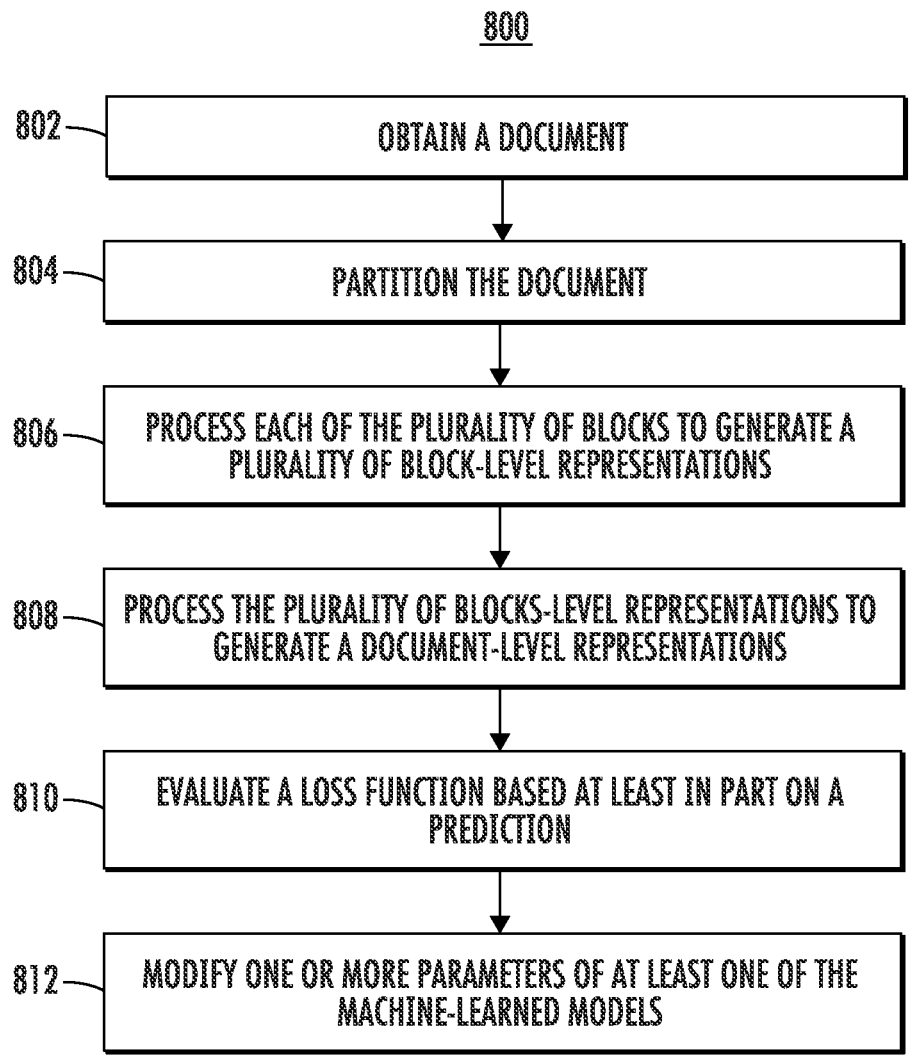
FIG. 8 depicts a flow chart diagram of an example method to perform document-level image pre-training according to example embodiments of the present disclosure.

FIG. 8 depicts a flow chart diagram of an example method to perform document processing training according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a document. The document can include text and images. Furthermore, the document can include layout data descriptive of the layout of text and images in the document. The document may be a webpage, an advertisement, or a variety of other document types.

At 804, the computing system can partition the document. The document can be partitioned into a plurality of blocks based at least in part on the layout data. The blocks can be text blocks, image blocks, or multimodal blocks. The blocks can include groups of text or media with similar style and location in the document.

At 806, the computing system can process each of the plurality of blocks to generate a plurality of block-level representations. The generated block-level representations can correspond respectively to each of the plurality of subsets of the plurality of blocks processed by a block-level model. In some implementations, the block-level model is a visual-linguistic encoder model. In some implementations, the block-level model can process the plurality of subsets of the plurality of blocks and the layout data associated with the plurality of subsets of the plurality of blocks to generate the block-level representations.

At 808, the computing system can process the plurality of block-level representations to generate a document-level representation. The plurality of block-level representations may be processed by a document-level model to generate the document-level representation. In some implementations, the document-level representation may be a visual-linguistic encoder model.

At 810, the computing system can evaluate a loss function based at least in part on a prediction. The prediction can be based on the document-level representation.

At 812, the computing system can modify one or more parameters of at least one of the machine-learned models. In some implementations, the machine-learned block-level encoder model can have one or more parameters modified. In some implementations, the machine-learned document-level encoder model can have one or more parameters modified. The one or more parameters can be modified based at least in part on the loss function.

In some implementations, the prediction can include a block-ordering prediction. The block-ordering prediction can be generated by switching at least a first block and a second block from the plurality of blocks and generating a binary prediction that indicates whether the plurality of blocks are in a correct order based at least in part on the document-level representation. In some implementations, switching the first block and the second block from the plurality of blocks occurs before the processing each of the plurality of blocks with the machine-learned block-level encoder model. The binary prediction can be the block-ordering prediction.

In some implementations, the prediction can include a predicted text block. The predicted text block can be generated by masking a block-level representation generated for one or more text blocks of the plurality of blocks and selecting the predicted text block from a plurality of candidate text blocks based at least in part on the document-level representation. In some implementations, the masking can occur before processing the plurality of block-level representations with the machine-learned document-level encoder model.

The prediction can include a predicted image. The predicted image can be generated by masking one or more images included in one or more blocks of the plurality of blocks and selecting the predicted image from a plurality of candidate images based at least in part on the document-level representation. In some implementations, the masking can occur before processing each of the plurality of blocks with the machine-learned block-level encoder model.

Example Experimental Data

The below example experiments aim to answer the following questions: (1) Is the hierarchical implementation of an example document processing model effective? (2) Are the proposed layout-aware training objectives effective, and how are they complementing one another? (3) When and on what tasks does the multimodality help?

For experimental purposes, two document completion tasks can be designed for evaluating the models. The first task can include text block filling to assess the model capability of interpreting the structure of the textual contents. The second task can include image suggestion, which concerns the layout multimodality in addition to the structural aspect on texts.

Text block filling can include randomly selecting a block $blk_i$ to mask, after blocks are sorted and then serialized. The context $blk_{1:i-1}$ can be provided as inputs to the model, while leaving $blk_{j:j+K} \cup blk_i$ as candidates, where $j>i$, $blk_j$ is spatially positioned after $blk_i$ by a certain margin (four rows in a common web-page document). The closest K (K=5) blocks can abide by the criteria selected to make the task challenging. The task can then be to predict the correct block $blk_i$ from the candidate blocks. Note that the masked block $blk_i$ can be of any type of textual blocks, including header, an item from a list or table, etc. The capability of prediction can rely heavily on the understanding of the structure of the document.

Image suggestion can involve the model taking all the content blocks of a document with an image masked-out (by replacing it with all-white-image) as inputs. Furthermore, the model can be used to predict the correct image from a given set of candidate images (including the ground truth of the masked out one). C (C=1000 in this work) candidate images from documents not previously processed can be extracted. Since this task aims to simulate suggesting the image contents when composing a novel document, for a more realistic setting, the image suggestion experimental tests can involve stripping the textual blocks which encompass the direct captions to the images in the dataset used for this task.

Further testing can involve fine-tuning on downstream tasks. To allow for better fusion of low and high-level information, document-level representations can involve dependency on both block-level and document-level data denoted as $R_{doc}=\sigma(\alpha) \cdot blkh_{global\text{-}CLS}+(1-\sigma(\alpha)) \cdot out_{global\text{-}CLS}$ to represent a document, where a is a task-dependent learnable scalar and $\sigma$ is the Sigmoid function. An MLP can be trained to embed the document representation $R_{doc}$ to retrieve from a set of candidate embeddings $\{R_{cand}\}$ with a contrastive loss, where $R_{cand,i}=i$ for text block filling and $R_{cand,i}=img,i$ for image suggestion. Denote Y as equals to 1 if $R_{doc}$ is paired with the ground truth $R_{gt}$, and 0 otherwise, and m is a predefined margin, which leads to the denoted formula:

$$D_w(R_{doc}, R_{cand,i}) = \|MLP(R_{doc}) - MLP(R_{cand,i})\|_2$$

$$L_{contrastive} = (1-Y)\tfrac{1}{2}(D_w)^2 + (Y)\tfrac{1}{2}\{\max(0, m-D_w)\}^2.$$

Some implementations of the hierarchical transformer systems and methods disclosed herein can be compared to a single-level layout language model and a CNN-Grid model.

A single-level, non-hierarchical variant of a document processing model framework can include only the lower-level model, which resembles the base model of a two-level model. For training, both low-level objectives of the document processing model, masked language modeling (MLM) and image-text matching (ITM), can be utilized. Comparing a hierarchical framework against this baseline can allow for examining the effectiveness of the hierarchical formulation and the high-level objectives.

CNN-Grid can involve experimenting with replacing a transformer-based higher-level model with a CNN module. Each block-level representation i can be inserted into a position on a 2D map according to the sorted 2D coordinates of the block. The representation insertions can result in a 3D tensor, where the original 1D i representation can become the channel dimension, and hence can be the input to a CNN module. While the output representation of the CNN can act as the overall representation of the entire document, the example system can apply an average pooling at the output of the CNN module to obtain the document-level representation of the same size. Since the CNN can be viewed as a substitute of the higher-level model, the CNN-Grid baseline can be trained with the same set of objectives as a hierarchical multi-transformer model, and hence the CNN-Grid baseline can be used as an alternative that can include training with additional layout-aware objectives.

Unimodality (Text-Only) can also be a beneficial aspect to examine how example frameworks perform particularly for the text block filling task. Both the single-level and hierarchical frameworks can be tested on purely text input.

In some implementations, the lower-level models can be initialized with BERT-base-uncased pretrained weights. A pretrained CNN model can be adopted for all the models and baselines. The CNN models can be used to encode the images, before the images are transformed to the same embedding size of the Wordpiece token embedding, 768, with an MLP layer. For both block-MLM and image fitting pretraining objectives, the system can empirically select 20 for the size of the candidate set, and the final output projection layers for the two objectives can be a 20-way classification. For block-ordering, the output projection MLP can be performing binary classification.

A collection of English Wikipedia pages (Wikipages) can be used for training and evaluating the models. The Wikipage dataset can be uniformly sampled (scraped) from Wikipedia, which can make the dataset diverse across a variety of topics and genres. In some implementations, the systems or methods can preprocess the collected Wikipages by tokenizing them into content blocks, and can perform a 2D sorting. Table 1 depicts general statistics of the Wikipedia dataset. Note that the Wikipages used in the downstream tasks are disjointed from the pretraining set. For the image suggestion task, the system or method may retain only the pages with at least one image.

| Type | | Counts |
|---|---|---|
| Total Pretraining Wikipages | | 6.2M |
| Total Wikipages for Text Block Filling | | 30K |
| Total Wikipages for Image Suggestion | | 28K |
| Downstream Train/Val/Test | | 70%/10%/20% |
| Type | Mean | STD |
| # Blocks in a Wikipage | 93.51 | 231.31 |
| # Images in a Wikipage | 0.46 | 1.33 |
| Document Token Length | 1083.02 | 1963.98 |

Since the downstream tasks can be trained with a contrastive objective and can be performed in a retrieval fashion, two common ranking-based metrics can be used to quantify the model performances: Mean Reciprocal Rank (MRR) and Recall @ K.

Mean Reciprocal Rank (MRR) can include computing the reciprocal (the multiplicative inverse) ranks of the ground truth items in the given candidates list and can include averaging them across the whole test set.

Recall @ K can include computing the recall in the top-K ranked items by counting the number of the ground truth items in such a top-K candidate list. The recall can be binary existence divided by K.

Table 2 summarizes the model performances on the two proposed downstream tasks. An implementation of a hierarchical layout-aware multimodal pretraining for document understanding model, or LAMPreT model, is tested and compared to the baselines.

| Method | Modality | Text Block Filling | | | Image Suggestion (C = 1000) | |
|---|---|---|---|---|---|---|
| | | F1-Score | Precision(%) | Recall(%) | Recall @ 5 (%) | MRR (%) |
| CNN-Grid | Multimodal | 39.92 | 40.45 | 39.4 | 67.33 | 62.6 |
| Single-Level | Text-Only | 51.49 | 39.93 | 72.45 | — | — |
| LayoutLM | Multimodal | 51.3 | 41.4 | 67.43 | 75.99 | 76.54 |
| LAMPRET | Text-Only | 52.36* | 42.37* | 68.5 | — | — |
| | Multimodal | 52.09* | 41.85* | 68.98 | 99.98* | 98.55* |

For the text block filling downstream task, the LAMPreT example hierarchical model outperforms the baselines in both the precision percentage and F-1 score metrics. Among the tested models, the CNN-Grid baseline performs the worst. This could be a product of the attention mechanism in transformers capturing the block-level interactions better.

For image suggestion, the LAMPreT example hierarchical model achieves almost perfect performance for both metrics (around 99%), while all the baseline models suffer significant performance degradation. The hierarchical formulation and the accompanying high-level objectives are proven effective in the hierarchical model as compared to the single-level LayoutLM alternative. The CNN-Grid baseline again generally performs the worst on both metrics.

Furthermore, Table 3 can aid in analyzing the contributions of the high-level pretraining objectives for different downstream tasks. Table 3 shows an ablation analysis on the multimodal version of the LAMPreT example hierarchical framework. At each row, the table displays the exclusion of (1) one of the high-level pretraining objectives, or (2) the layout attributional features. In general, the block-ordering objective can be empirically proven quite effective for both downstream tasks, judged by the performance degradation when it is excluded during the pretraining.

|  | Text Block Filling | | | Image Suggestion | |
| --- | --- | --- | --- | --- | --- |
| Abstract Components | F1-Score | Precision (%) | Recall (%) | Recall @ 5 (%) | MRR (%) |
| w/o Image Fitting Objective | 50.72 | 38.82 | 39.4 | 90.63 | 89.68 |
| w/o Block-MLM | 51.18 | 41.46 | 66.86 | 86.11 | 85.26 |
| w/o Block-Ordering | 50.19 | 37.78 | 74.76 | 69.57 | 69.51 |
| w/o Layout-Attributes | 50.98 | 40.39 | 69.07 | 96.42 | 95.27 |
| Multimodal LAMPreT | 52.09 | 41.85 | 68.98 | 99.98 | 98.85 |

In some implementations, the systems and methods can be used for multilingual transfer learning. For example, the system can be used for Wiki category classification. The model can be pretrained on multiple languages and be specifically fine-tuned on Wiki category classification on English pages. Category processing can then be run on other Wiki pages to classify the pages even if the pages are not in English.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for generating layout-aware document representations, the method comprising:
   obtaining, by a computing system comprising one or more computing devices, a document, wherein the document comprises text and one or more images, and wherein layout data is associated with the document;
   partitioning, by the computing system, the document into a plurality of blocks based at least in part on the layout data;
   processing, by the computing system, the plurality of blocks with a hierarchical encoder model to generate a document-level representation, wherein generating the document-level representation comprises:
     processing, by the computing system, each of the plurality of blocks with a machine-learned block-level encoder model of the hierarchical encoder model to respectively generate a plurality of block-level representations for the plurality of blocks, wherein, for each of the plurality of blocks, the layout data associated with such block is provided as input to the machine-learned block-level encoder model;
     determining a plurality of block local connections based on recognizing relationships between neighboring blocks of the plurality of blocks;
     processing, by the computing system, the plurality of block-level representations and the plurality of block local connections with a machine-learned document-level encoder model of the hierarchical encoder model to generate the document-level representation for the document;
   providing, by the computing system, the document-level representation as an output; and
   processing, by the computing system, the document-level representation to generate an image suggestion descriptive of a particular image from a set of candidate images to suggest to place in the document, wherein the hierarchical encoder model was trained based at least in part on a loss function that evaluates output document-level representations based on an image-text matching prediction, wherein the image-text matching prediction is descriptive of a binary matching prediction of whether a particular image was replaced with one or more training images from a different training document.

2. The method of claim 1, wherein the layout data comprises at least one of style data, font data, or color data descriptive of one or more of the plurality of blocks in the document.

3. The method of claim 1, wherein the layout data comprises spatial layout data descriptive of spatial positions of the plurality of blocks within the document.

4. The method of claim 1, wherein partitioning, by the computing system, the document comprises partitioning, by the computing system, the document based at least in part on one or more HTML tags associated with the document.

5. The method of claim 1, wherein at least one of the plurality of blocks comprises both textual content and image content.

6. The method of claim 1, wherein processing, by the computing system, each of the plurality of blocks that includes one or more images with the machine-learned block-level encoder model comprises processing the one or more images included in a block with a convolutional neural network and an embedding model to generate one or more image embeddings for the one or more images.

7. The method of claim 1, wherein one or both of the machine-learned block-level encoder model and the machine-learned document-level encoder model comprises a multi-headed self-attention model; and wherein the hierarchical encoder model was trained based at least in part on:
   obtaining a training document and one or more other training documents;
   replacing one or more training images of the training document with one or more second training images of the one or more other training documents;
   processing the training document with the hierarchical encoder model to generate a training document-level representation;
   processing the training document-level representation to generate the image-text matching prediction; and
   modifying, by the computing system, one or more parameters of at least one of the machine-learned block-level encoder model or the machine-learned document-level encoder model based at least in part on the image-text matching prediction.

8. The method of claim 1, wherein partitioning, by the computing system, the document into the plurality of blocks comprises processing hypertext markup language of the document with a tokenizer.

9. The method of claim 1, further comprising: processing, by the computing system, the document-level representation with a search engine to generate a results list, wherein the results list comprises a plurality of additional documents with data related to that of the document.

10. The method of claim 1, further comprising: generating, by the computing system, a document summary based at least in part on the document-level representation.

11. The method of claim 1, wherein the layout data is encoded in attention maps.

12. The method of claim 1, wherein the layout data comprises position data, wherein the plurality of blocks comprises a first block and a second block, and wherein the position data comprises data descriptive of a relative position of the first block in relation to the second block.

13. The method of claim 1, wherein:
   the machine-learned block-level encoder model is trained with block-level pretraining objectives, wherein the block-level pretraining objectives comprise masked language modeling and image-text matching; and
   the machine-learned document-level encoder model is trained with document-level pretraining objectives, wherein the document-level pretraining objectives comprise block-ordering prediction, masked-block prediction, and image fitting.

14. A computer system, comprising:
   one or more processors;
   one or more non-transitory computer readable media that collectively store instructions that, when executed by the one or more processors, cause the computing system to perform operations, the operations comprising:
      obtaining, by the computing system, a document, wherein the document comprises text and one or more images, and wherein layout data is associated with the document;
      partitioning, by the computing system, the document into a plurality of blocks based at least in part on the layout data;
      obtaining, by the computing system, a training document that differs from the document, wherein the training document comprises one or more training images;
      replacing, by the computing system, the one or more images of the document with the one or more training images of the training document;
      processing, by the computing system, the plurality of blocks with a hierarchical encoder model to generate a document-level representation, wherein generating the document-level representation comprises:
         processing, by the computing system, each of the plurality of blocks with a machine-learned block-level encoder model of the hierarchical encoder model to respectively generate a plurality of block-level representations for the plurality of blocks, wherein, for each of the plurality of blocks, the layout data associated with such block is provided as input to the machine-learned block-level encoder model;
         determining a plurality of block local connections based on recognizing relationships between neighboring blocks of the plurality of blocks;
         processing, by the computing system, the plurality of block-level representations and the plurality of block local connections with a machine-learned document-level encoder model of the hierarchical encoder model to generate the document-level representation for the document;
      processing, by the computing system, the document-level representation to generate an image-text matching prediction, wherein the image-text matching prediction is descriptive of a binary matching prediction of whether a particular image was replaced;
      evaluating, by the computing system, a loss function based at least in part on the image-text matching prediction that is based on the document-level representation; and
      modifying, by the computing system, one or more parameters of at least one of the machine-learned block-level encoder model or the machine-learned document-level encoder model based at least in part on the loss function.

15. The computer system of claim 14, wherein the prediction comprises a block-ordering prediction, wherein the block-ordering prediction is generated by:
   switching, by the computing system, at least a first block and a second block from the plurality of blocks, wherein switching the first block and the second block from the plurality of blocks occurs before the processing, by the computing system, each of the plurality of blocks with the machine-learned block-level encoder model; and
   generating, by the computing system, a binary prediction that indicates whether the plurality of blocks are in a correct order based at least in part on the document-level representation, wherein the binary prediction is the block-ordering prediction.

16. The computer system of claim 14, wherein the prediction comprises a predicted text block, wherein the predicted text block is generated by:
  before processing, by the computing system, the plurality of block-level representations with the machine-learned document-level encoder model: masking, by the computing system, a block-level representation generated for one or more text blocks of the plurality of blocks; and
  selecting, by the computing system, the predicted text block from a plurality of candidate text blocks based at least in part on the document-level representation.

17. The computer system of claim 14, wherein the prediction comprises a predicted image, wherein the predicted image is generated by:
  before processing, by the computing system, each of the plurality of blocks with the machine-learned block-level encoder model: masking, by the computing system, one or more images included in one or more blocks of the plurality of blocks; and
  selecting, by the computing system, the predicted image from a plurality of candidate images based at least in part on the document-level representation.

18. The computing system of claim 14, wherein the operations further comprise:
  evaluating, by the computing system, a block-level loss function based at least in part on an image-text matching prediction that is based on one or more of the block-level representations; and
  modifying, by the computing system, one or more parameters of the machine-learned block-level encoder model based at least in part on the block-level loss function.

19. One or more non-transitory computer readable media that collectively store instructions that, when executed by the one or more processors, cause a computing system to perform operations, the operations comprising:
  obtaining a document, and wherein layout data is associated with the document;
  partitioning the document into a plurality of blocks based at least in part on the layout data;
  obtaining a training document that differs from the document, wherein the training document comprises one or more training images;
  replacing the one or more images of the document with the one or more training images of the training document;
  processing each of the plurality of blocks with a machine-learned block-level encoder model to respectively generate a plurality of block-level representations for the plurality of blocks, wherein, for each of the plurality of blocks, the layout data associated with such block is provided as input to the machine-learned block-level encoder model, wherein the machine-learned block-level encoder model comprises a multimodal transformer model;
  processing the plurality of block-level representations with a machine-learned document-level encoder model to generate a document-level representation for the document, wherein the machine-learned document-level encoder model comprises a second transformer model that aggregates the plurality of block-level representations and respective connections to generate the document-level representation; and
  processing the document-level representation to generate a block-order prediction and an image-text matching prediction, wherein the block-order prediction is descriptive of whether input contents are following a proper order, and wherein the image-text matching prediction is descriptive of a binary matching prediction of whether a particular image was replaced;
  evaluating a loss function based at least in part on the block-order prediction and the image-text matching prediction that is based on the document-level representation; and
  modifying one or more parameters of at least one of the machine-learned block-level encoder model or the machine-learned document-level encoder model based at least in part on the loss function.

20. The one or more non-transitory computer readable media of claim 19, wherein the operations further comprise: determining a block type for each of the plurality of blocks based at least in part on the layout data.

* * * * *